United States Patent
Ikeda

(10) Patent No.: US 10,468,941 B2
(45) Date of Patent: Nov. 5, 2019

(54) DYNAMO/MOTOR WITH BUILT-IN SPEED CONVERTER

(71) Applicant: Kydo Ikeda, Ibaraki (JP)

(72) Inventor: Kydo Ikeda, Ibaraki (JP)

(73) Assignee: Kydo Ikeda, Ibaraki (JP)

( * ) Notice: Subject to any disclaimer, the term of this patent is extended or adjusted under 35 U.S.C. 154(b) by 59 days.

(21) Appl. No.: 15/568,928

(22) PCT Filed: Feb. 22, 2016

(86) PCT No.: PCT/JP2016/055001
§ 371 (c)(1),
(2) Date: Oct. 24, 2017

(87) PCT Pub. No.: WO2016/185744
PCT Pub. Date: Nov. 24, 2016

(65) Prior Publication Data
US 2018/0287457 A1    Oct. 4, 2018

(30) Foreign Application Priority Data

May 15, 2015  (JP) .................................. 2015-099674

(51) Int. Cl.
*H02K 7/02*      (2006.01)
*H02K 7/116*     (2006.01)
(Continued)

(52) U.S. Cl.
CPC ................ *H02K 7/02* (2013.01); *B60L 50/50* (2019.02); *F16H 15/10* (2013.01); *H02K 7/116* (2013.01);
(Continued)

(58) Field of Classification Search
CPC .......... H02K 7/02; H02K 16/02; H02K 7/116; H02K 21/24; H02K 49/10; H02K 21/26;
(Continued)

(56) References Cited

U.S. PATENT DOCUMENTS

| | | | |
|---|---|---|---|
| 7,586,209 B1 | 9/2009 | Lyatkher | |
| 2004/0055797 A1* | 3/2004 | White | H02K 7/02 180/65.1 |

(Continued)

FOREIGN PATENT DOCUMENTS

| | | |
|---|---|---|
| JP | H05-263888 A | 10/1993 |
| JP | 2002-204504 A | 7/2002 |

(Continued)

OTHER PUBLICATIONS

International Search Report (ISR) dated May 31, 2016, for PCT/JP2016/055001.

(Continued)

*Primary Examiner* — Naishadh N Desai
(74) *Attorney, Agent, or Firm* — Bacon & Thomas, PLLC

(57) ABSTRACT

An infinitely variable speed converter having at least two dynamo/motors, to reduce the thickness in the direction of the central shaft. A space is provided in a portion surrounded by a rotor arranged to rotate clockwise with either a drive disk or a drive gear, a rotor arranged to rotate counterclockwise with either a drive disk or a drive gear, and a radial interior of a stator formed by annularly disposing field magnets. When a traction roller or a traction gear penetrated by a drive shaft is inserted into the provided space, contacting the drive disk to be subject to a couple and thereby rotating while the traction gear comes into contact with the drive gear, whereby an output can be provided to the drive shaft that penetrates the traction roller or the traction gear, so that the entire structure can be compactified.

4 Claims, 22 Drawing Sheets

(51) Int. Cl.
  *H02K 16/02*  (2006.01)
  *F16H 15/10*  (2006.01)
  *H02K 21/24*  (2006.01)
  *H02K 49/10*  (2006.01)
  *H02K 21/26*  (2006.01)
  *B60L 50/50*  (2019.01)

(52) U.S. Cl.
  CPC ............. *H02K 16/02* (2013.01); *H02K 21/24* (2013.01); *H02K 21/26* (2013.01); *H02K 49/10* (2013.01); *B60L 2220/50* (2013.01); *B60L 2260/28* (2013.01)

(58) Field of Classification Search
  CPC ...... F16H 15/10; B60L 11/18; B60L 2220/50; B60L 2260/28
  See application file for complete search history.

(56) References Cited

U.S. PATENT DOCUMENTS

2008/0224473 A1* 9/2008 White ................... H02K 53/00
                                                                   290/52

2015/0033938 A1    2/2015 Erlston et al.

FOREIGN PATENT DOCUMENTS

| JP | 2010-263761 A | 11/2010 | |
|----|---|---|---|
| JP | 5292656 B1 | 9/2013 | |
| JP | 5432408 B1 | 12/2013 | |
| JP | 5432408 B1 * | 3/2014 | ............. F16H 15/12 |
| JP | 2014-112986 A | 6/2014 | |
| JP | 2015-045351 A | 3/2015 | |
| JP | 5878662 B1 | 3/2016 | |
| RU | 2516373 C2 | 2/2012 | |
| RU | 2499343 C1 | 10/2013 | |
| WO | 2014/087890 A | 6/2014 | |
| WO | 2015/029748 A | 3/2015 | |

OTHER PUBLICATIONS

Russian Search Report in related RU Registration No. 2017129564/7(051333), dated May 17, 2018.
Supplementary European Search Report in related European Application No. EP16796139, dated Mar. 16, 2018.

* cited by examiner

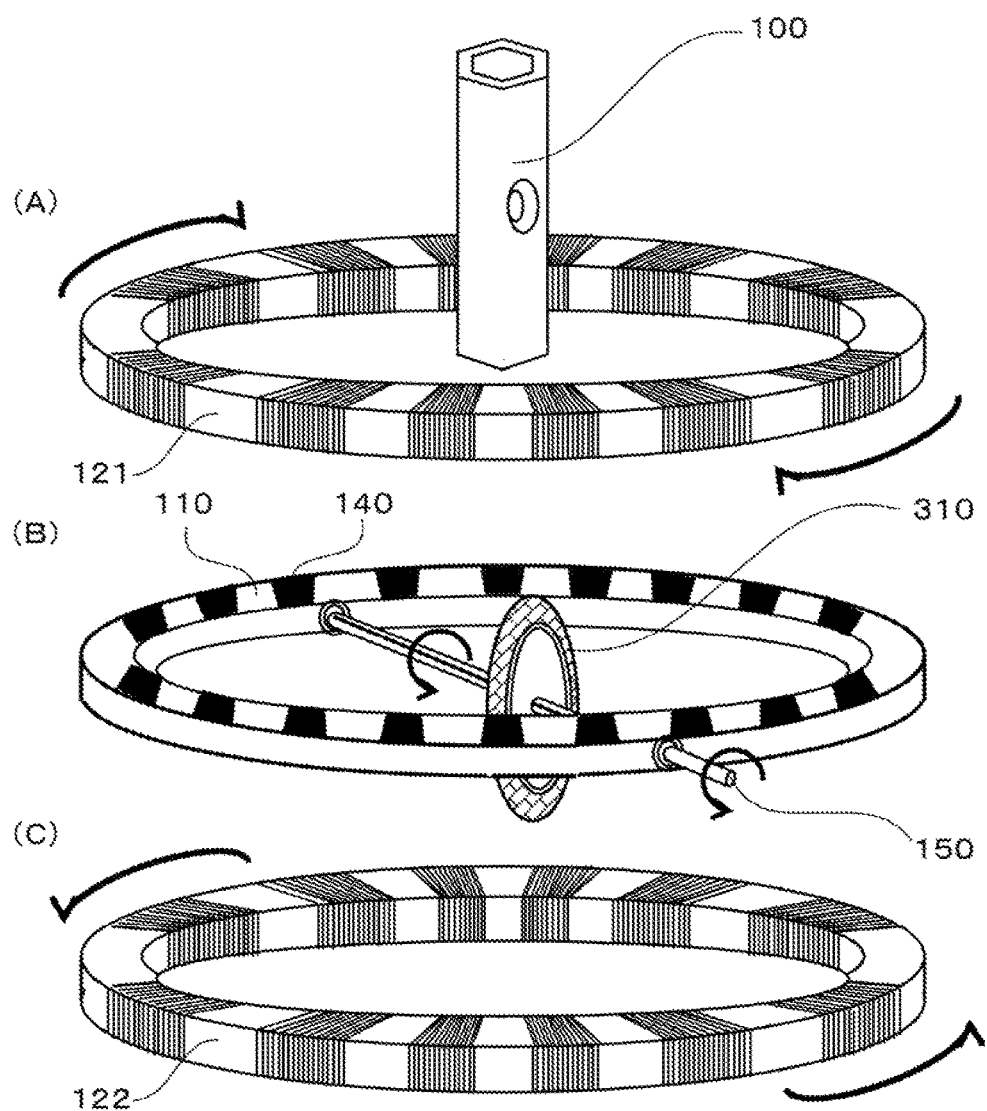
[Fig. 1]

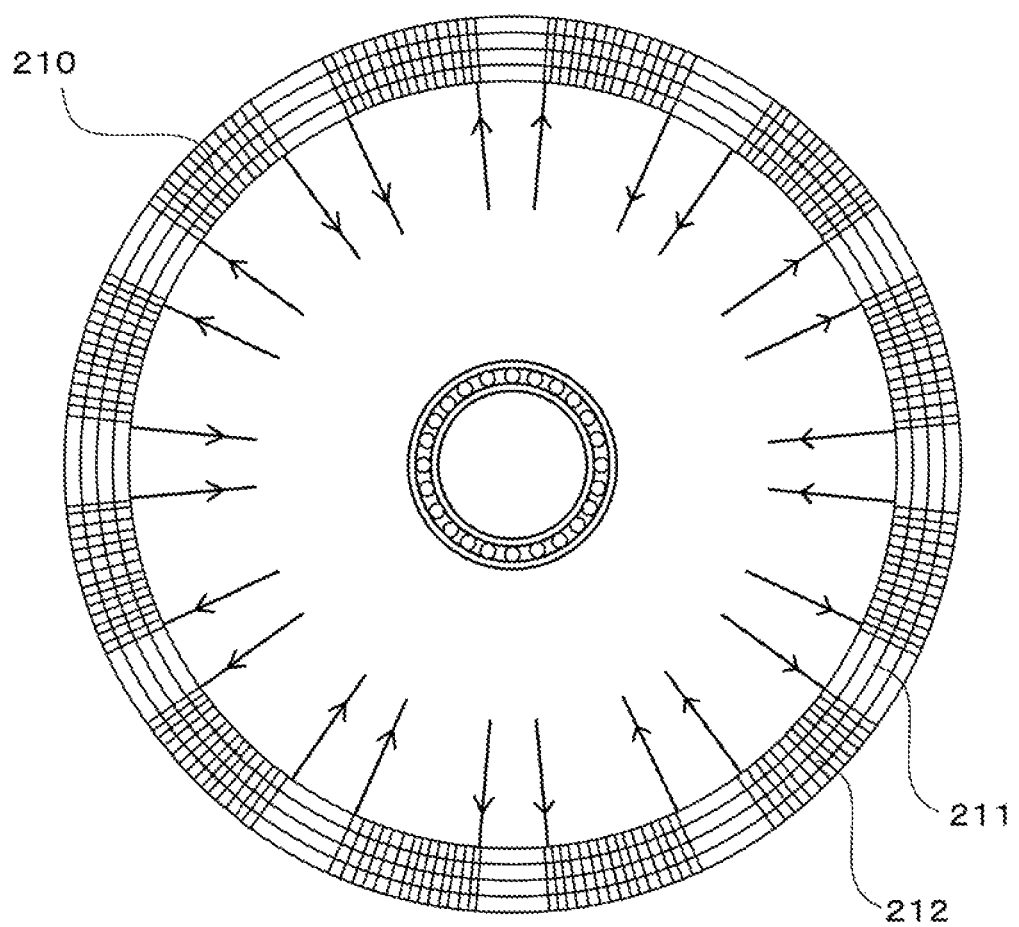
[Fig. 2]

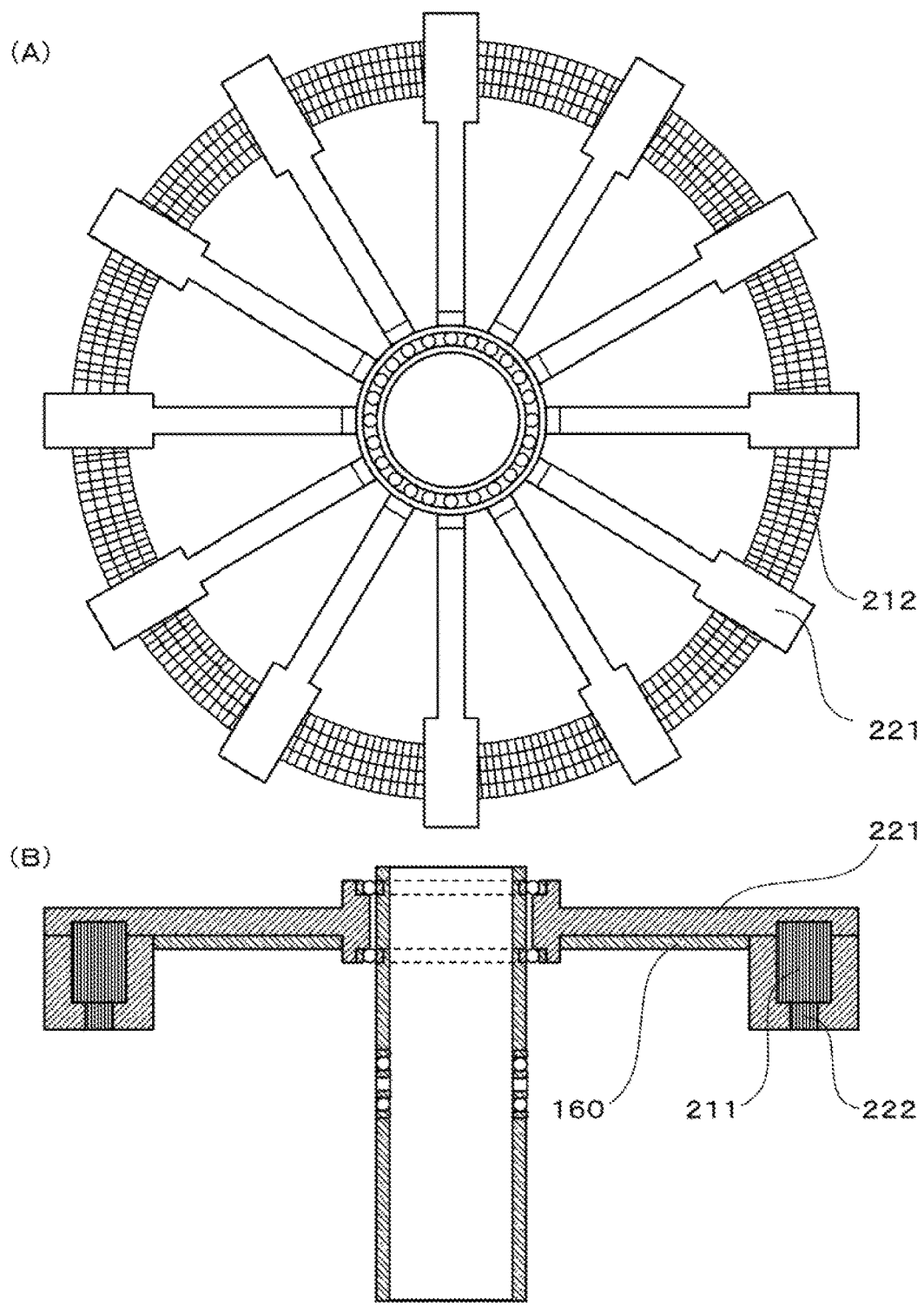
[Fig. 3]

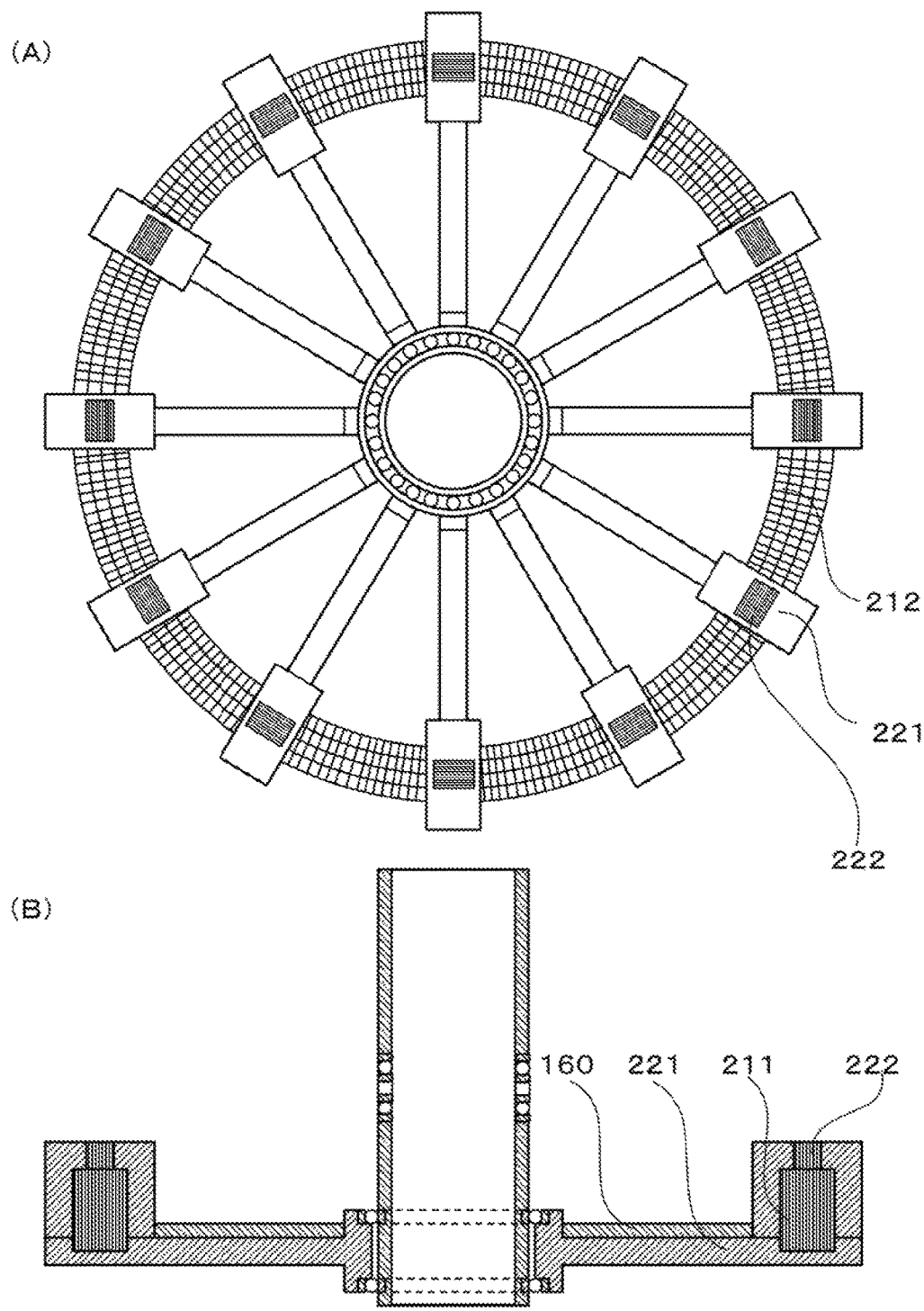
[Fig. 4]

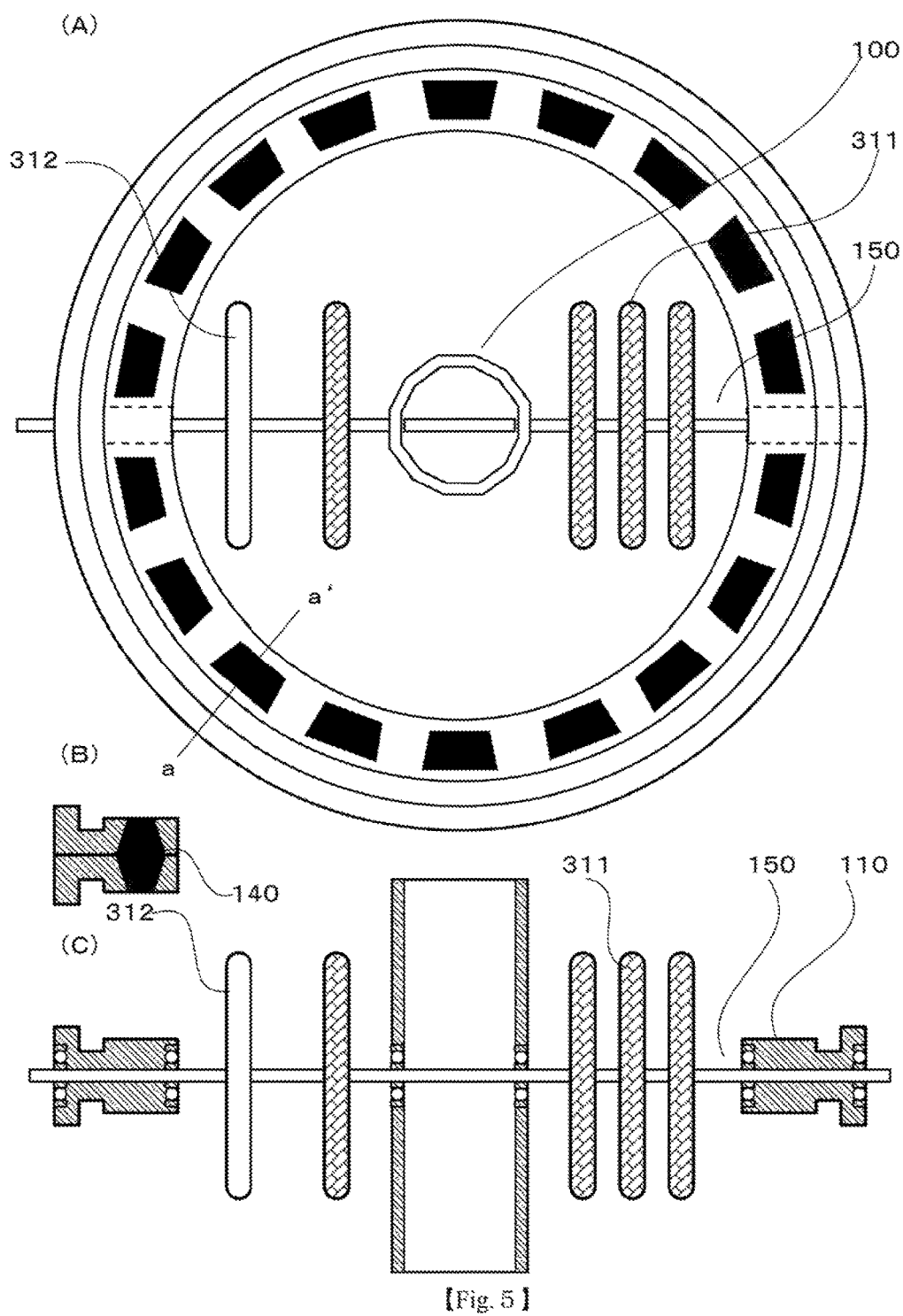
[Fig. 5]

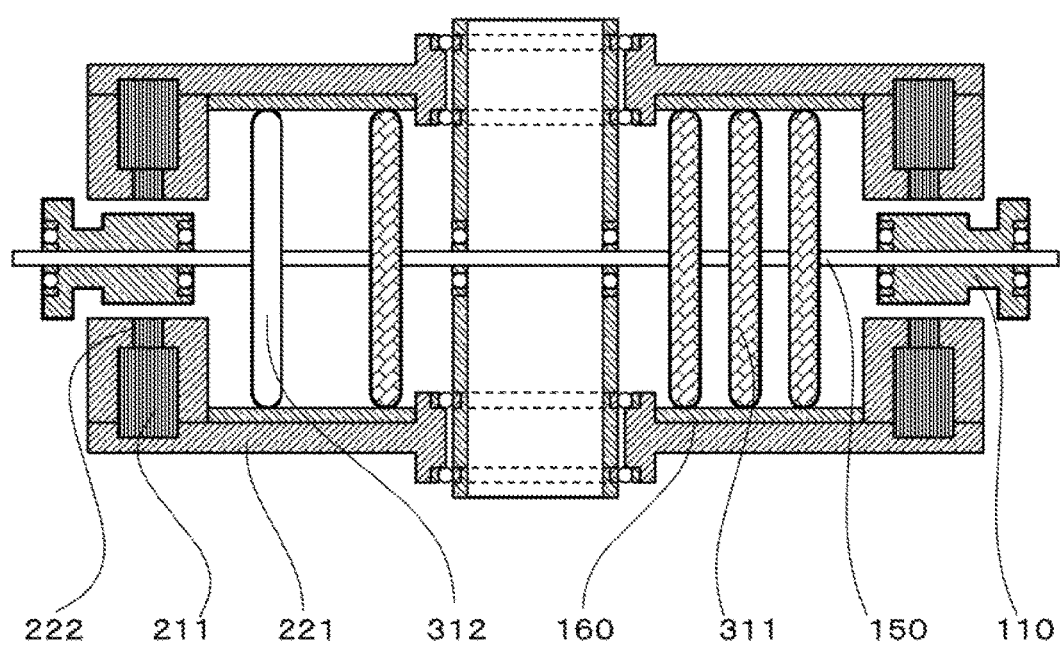
[Fig. 6]

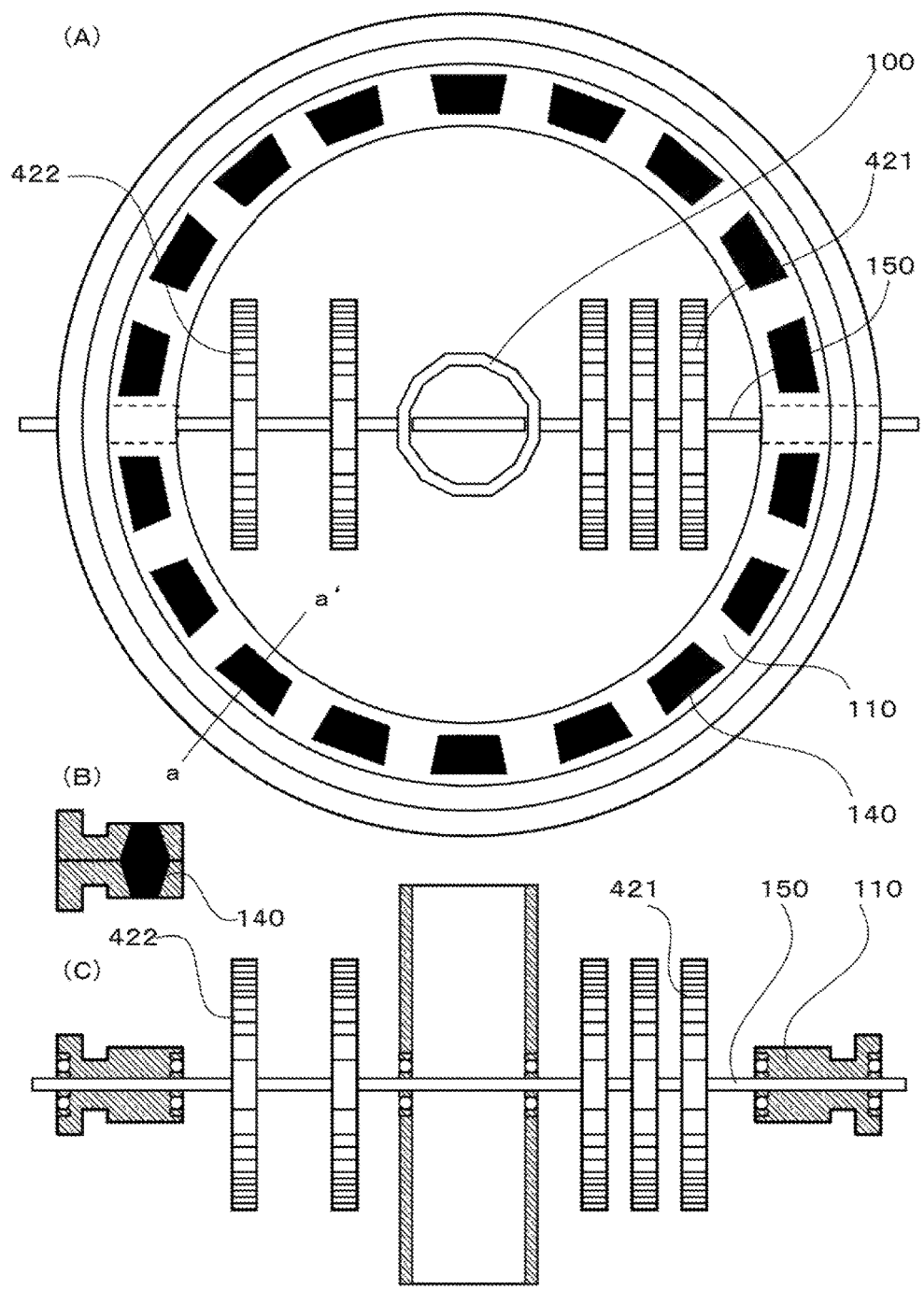
[Fig. 7]

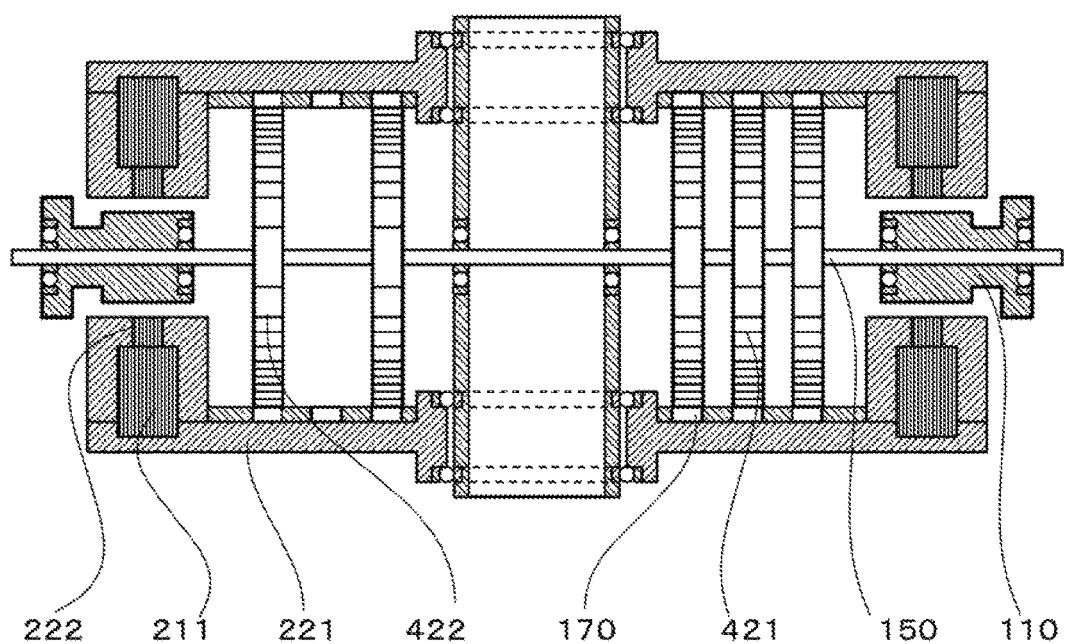
[Fig. 8]

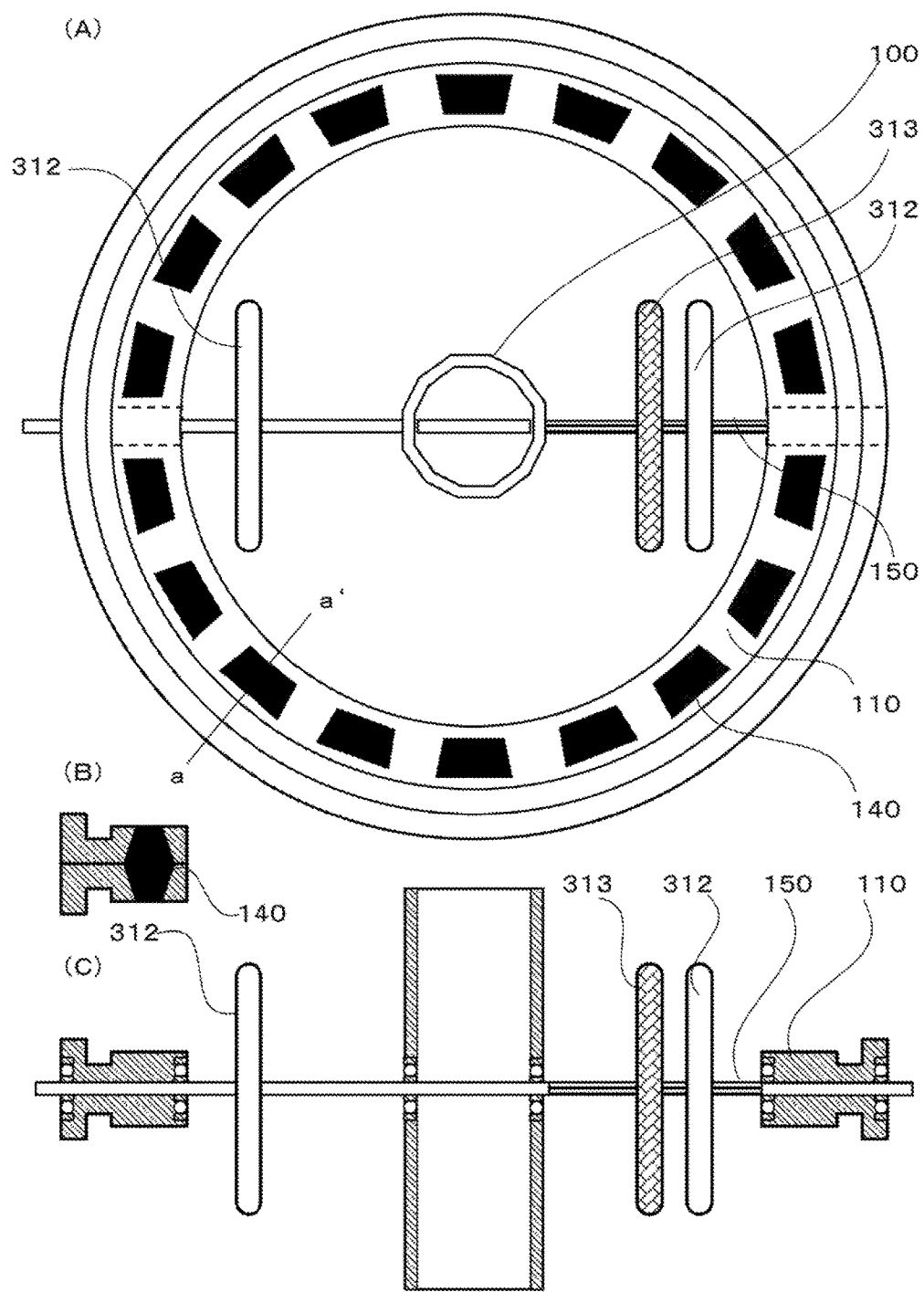
[Fig. 9]

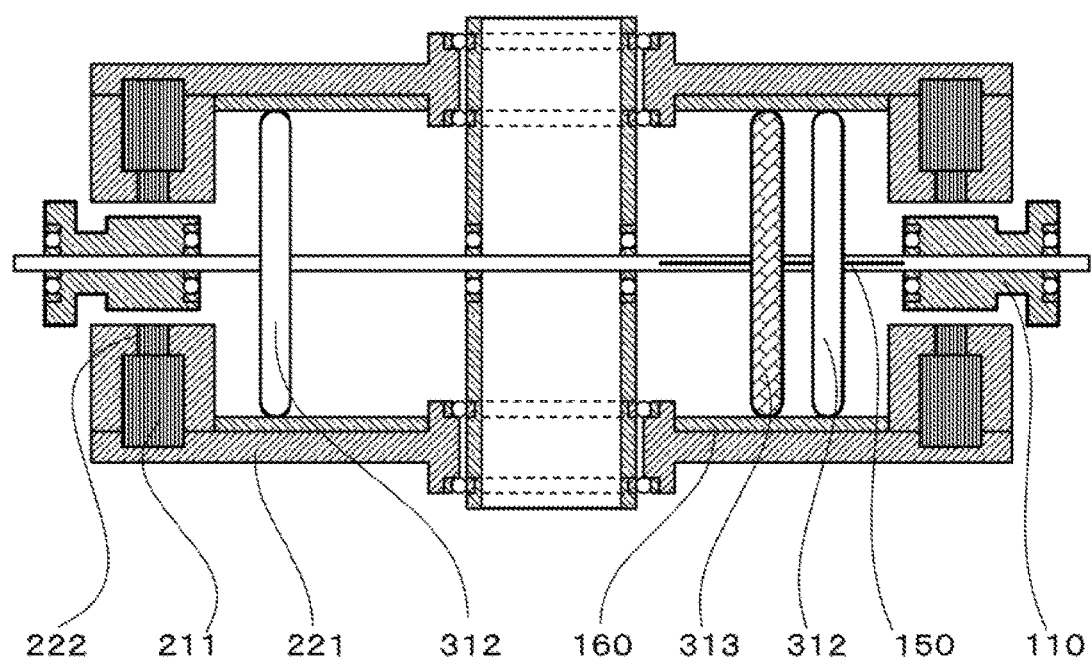
[Fig. 10]

(A)
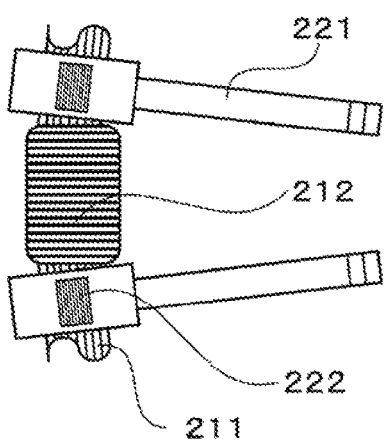
(B)
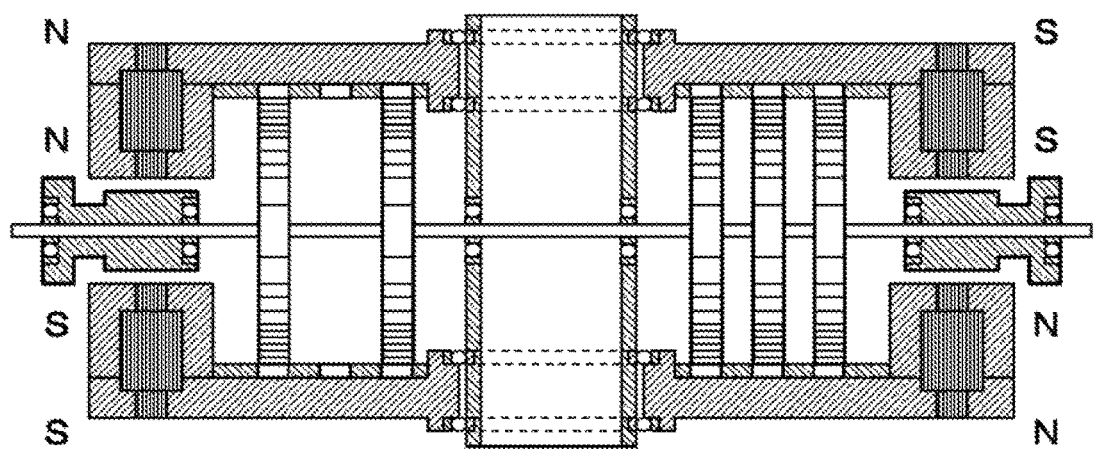
[Fig. 11]

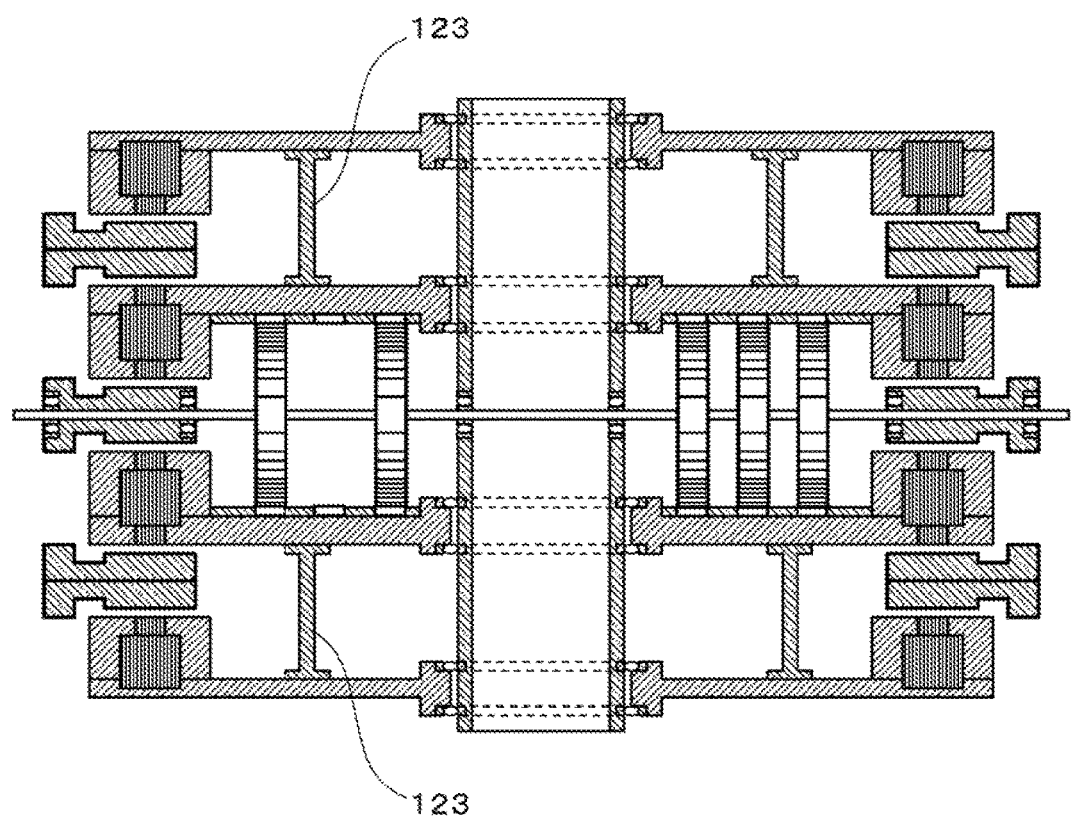
[Fig. 1 2]

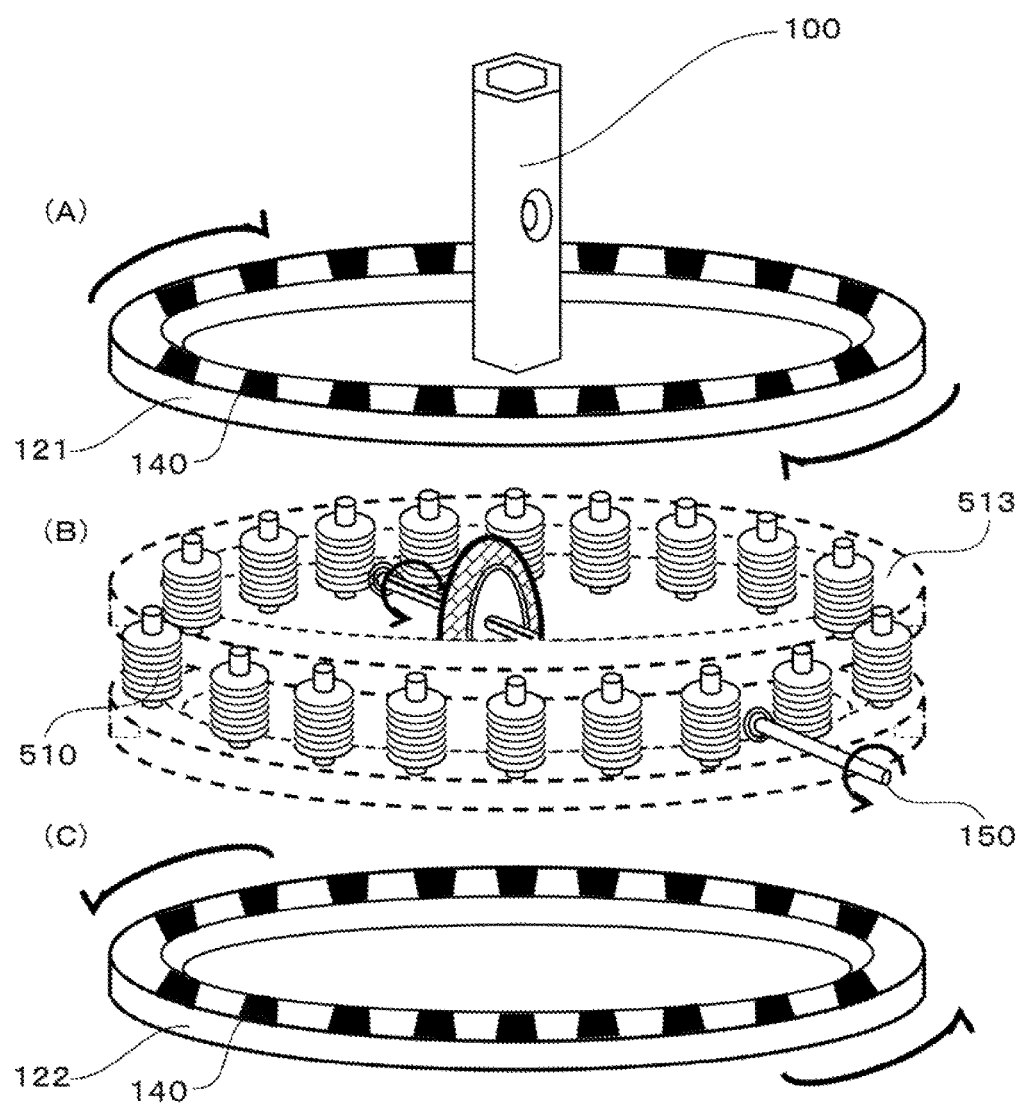
[Fig. 13]

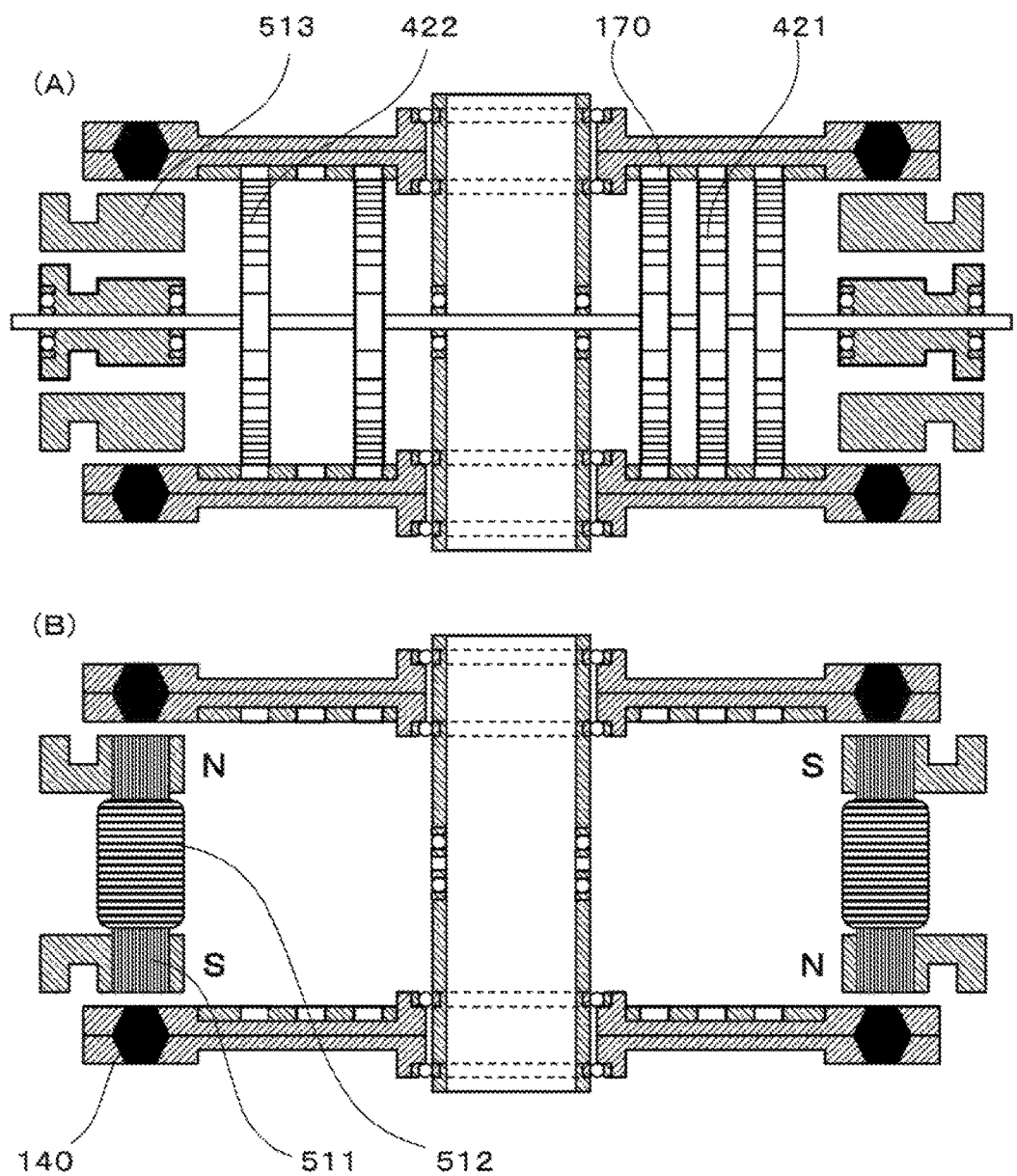
[Fig. 14]

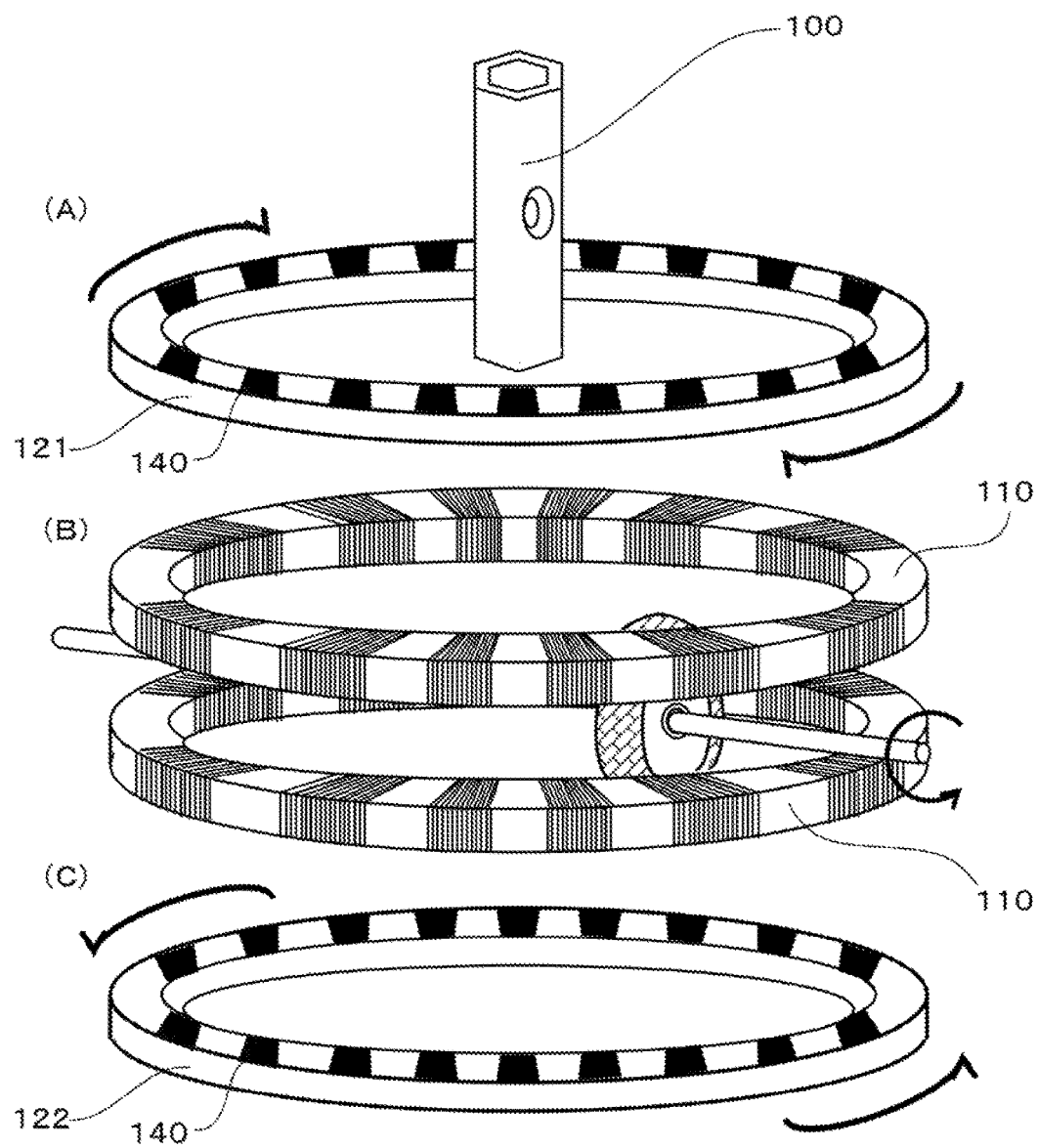
[Fig. 15]

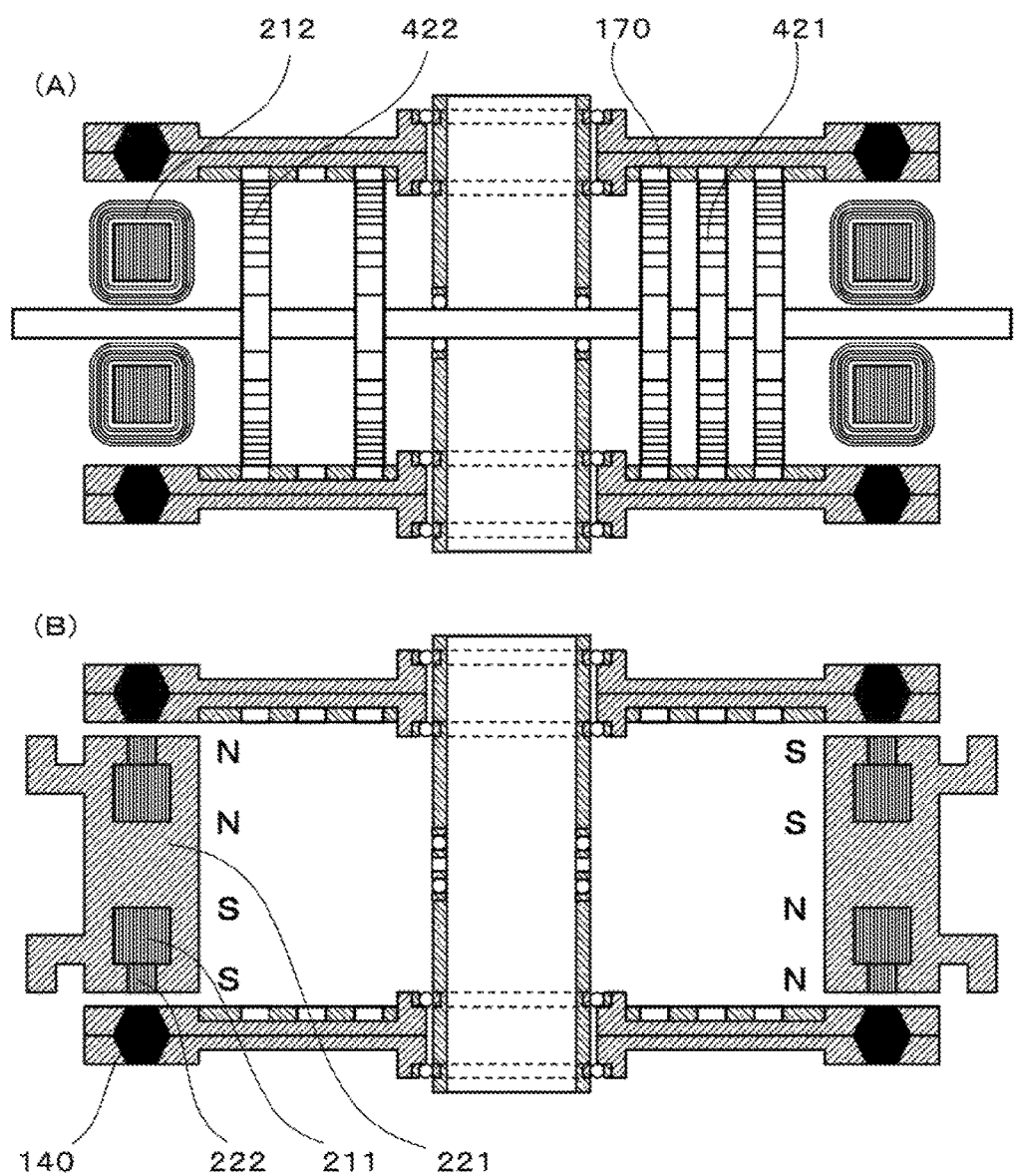
[Fig. 16]

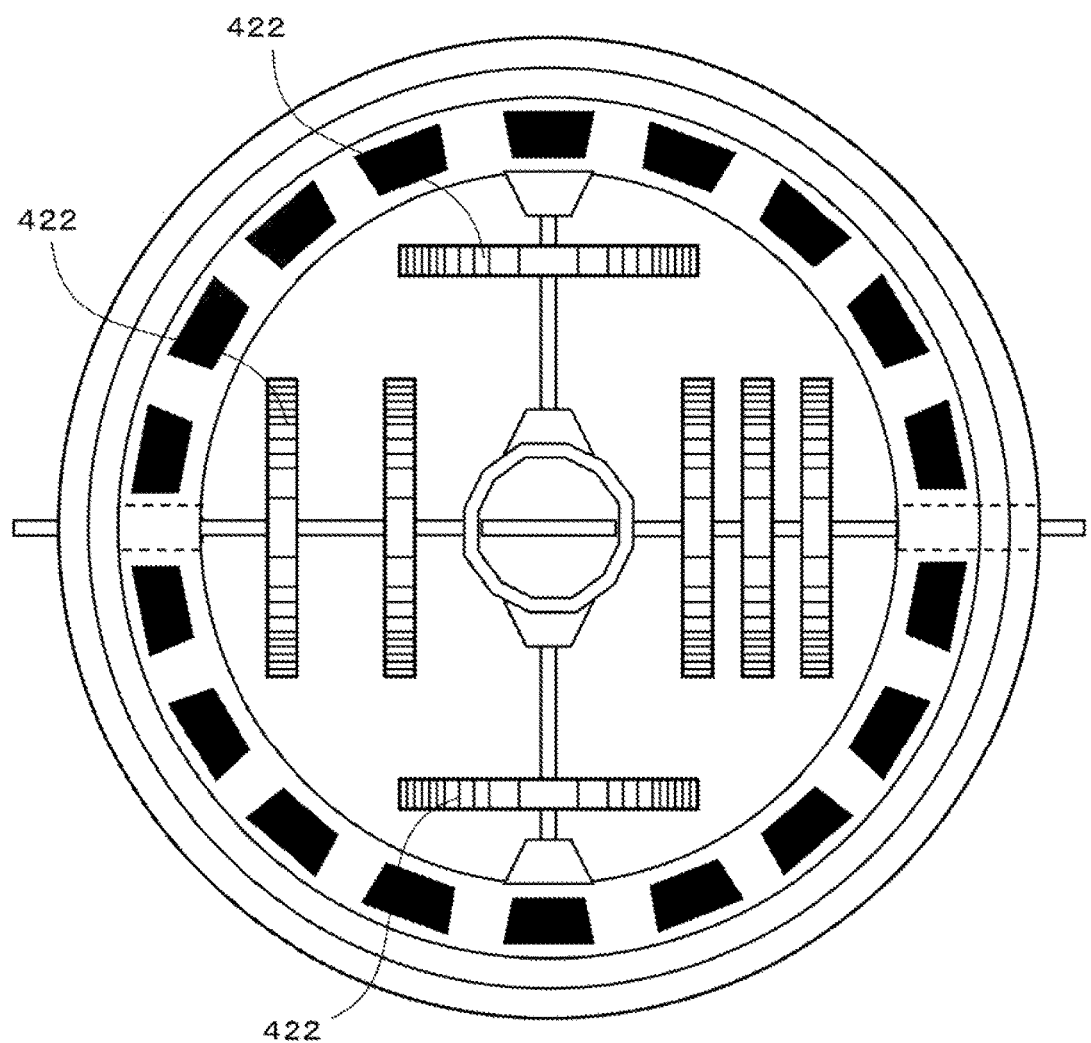
[Fig. 17]

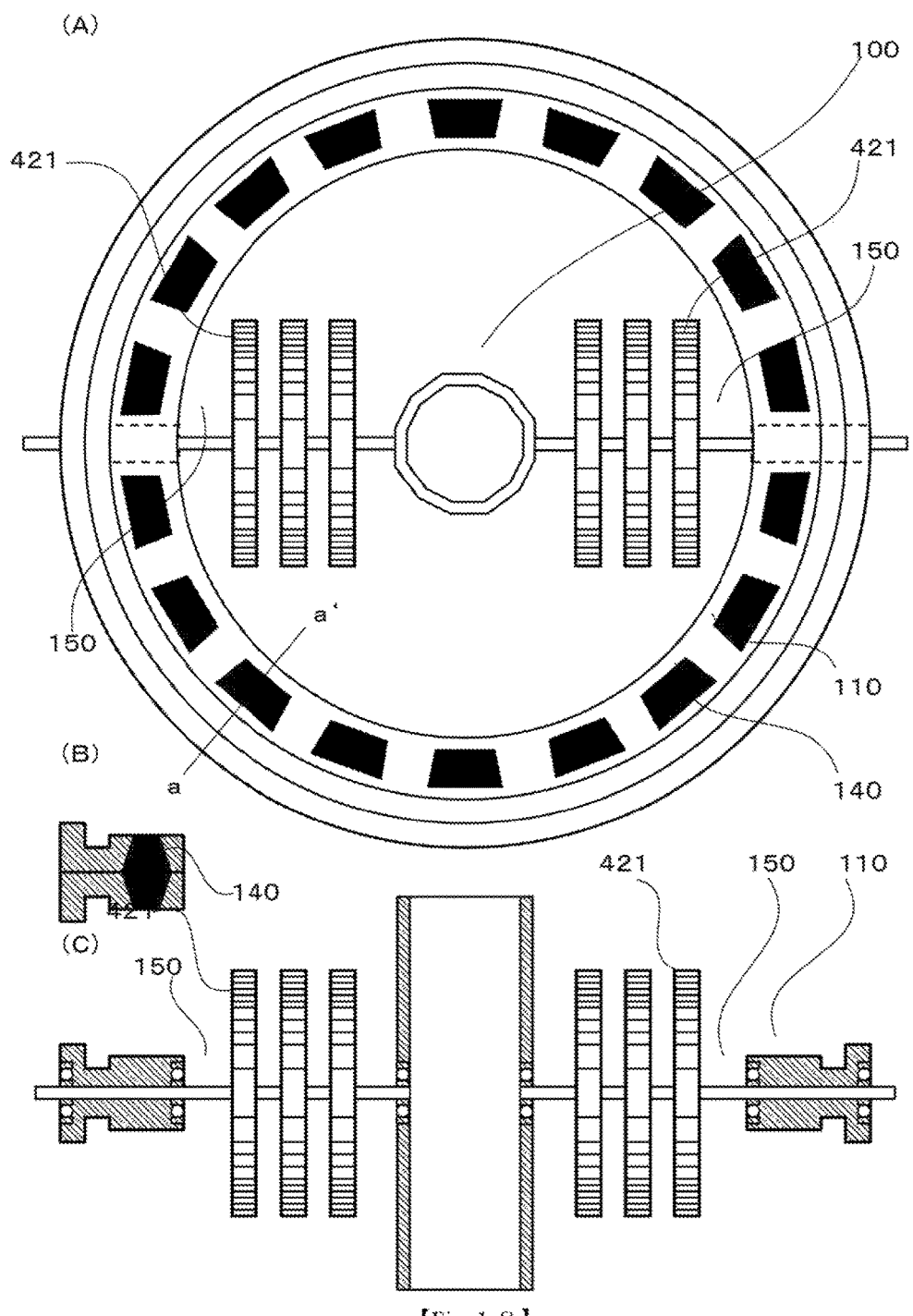
[Fig. 18]

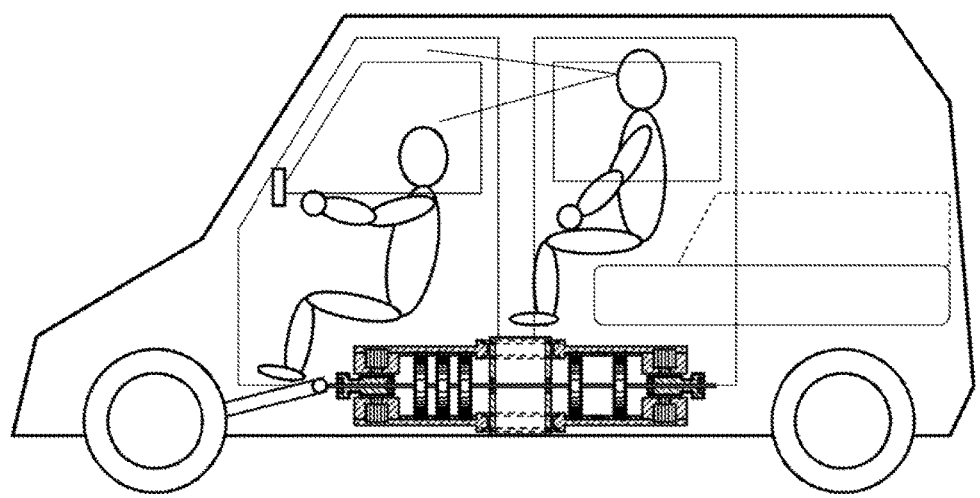
[Fig. 19]

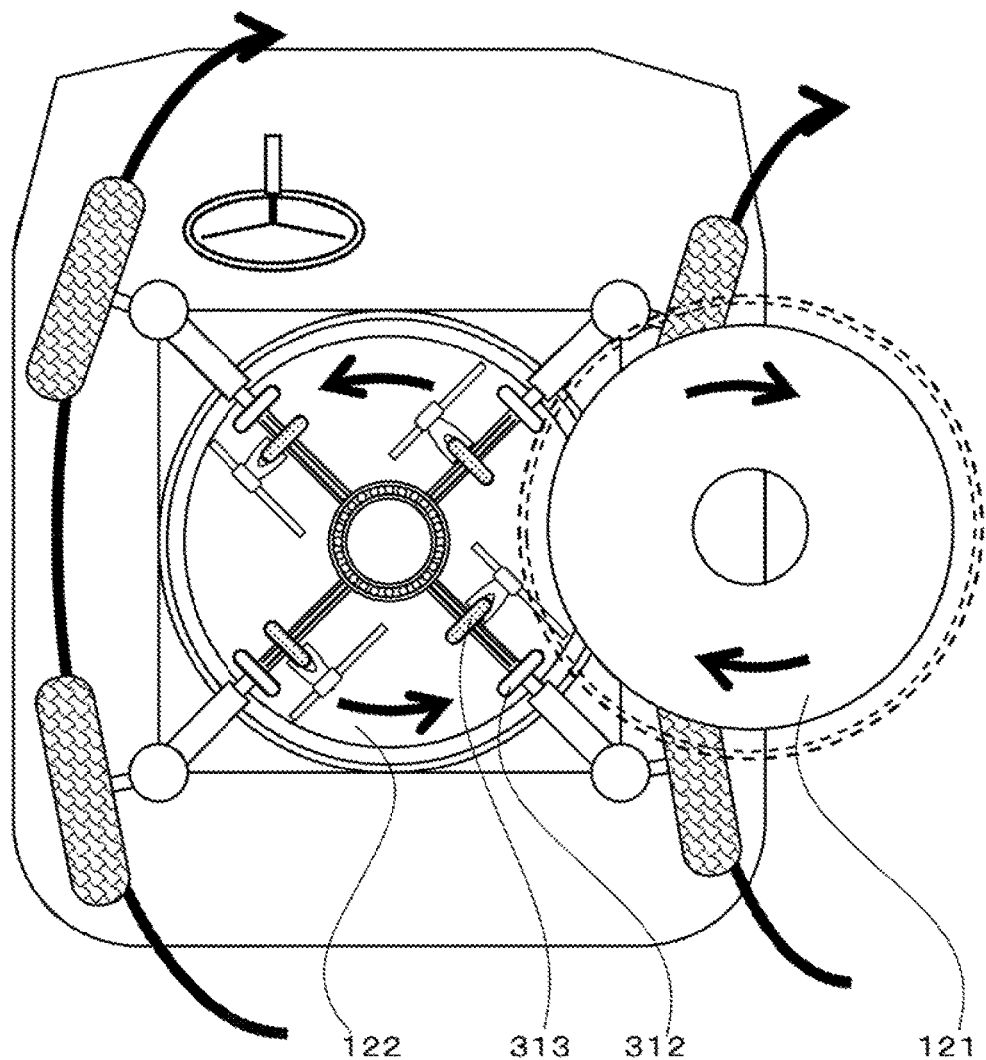
[Fig. 20]

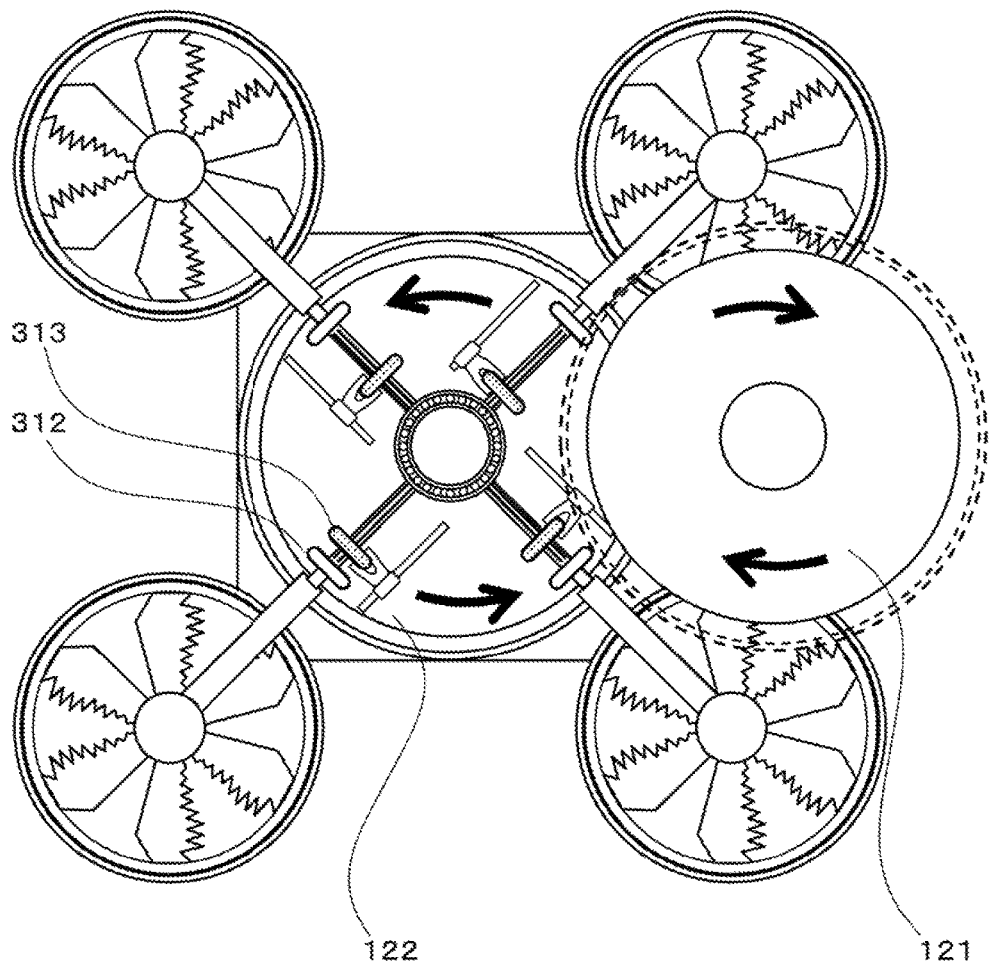
[Fig. 21]

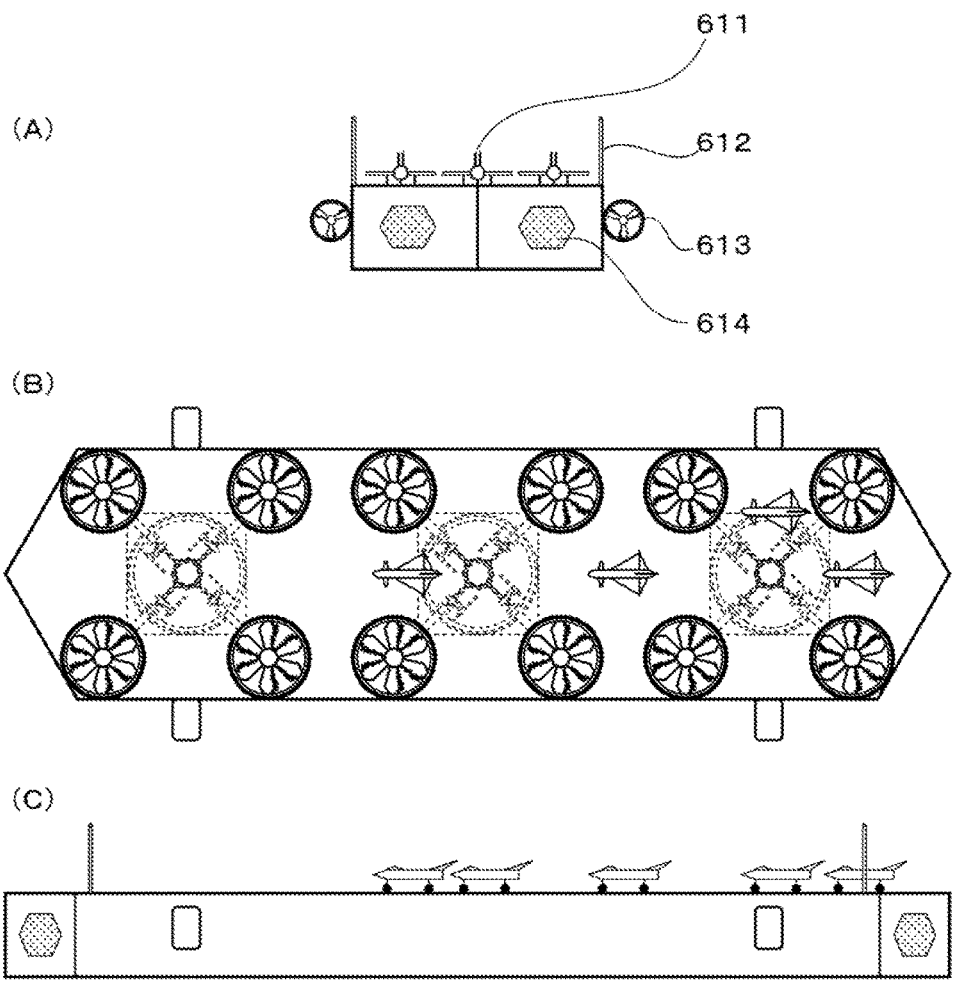
[Fig. 2 2]

DYNAMO/MOTOR WITH BUILT-IN SPEED CONVERTER

The invention relates to a dynamo/motor with built-in speed converter having, for a stator formed by annularly disposing permanent magnets or electromagnets as field magnets, at least one rotor mounted rotatably to a central shaft to rotate clockwise with at least one of a drive disk and a drive gear on one axial side at the center of the annular stator and at least one rotor mounted rotatably to the central shaft to rotate counterclockwise with at least one of a drive disk and a drive gear on the other axial side at the center of the annular stator, the dynamo/motor with built-in speed converter having a structure in which a space is provided in a portion surrounded by the drive disk or the drive gear of the rotor arranged to rotate clockwise, the drive disk or the drive gear of the rotor arranged to rotate counterclockwise, and the radial interior of the stator and, when a traction roller or a traction gear penetrated by a drive shaft is inserted into the provided space, the traction roller comes into contact with the drive disk to be subject to a couple and thereby to rotate, while the traction gear comes into contact with the drive gear to be subject to a couple and thereby to rotate, whereby an output can be provided to the drive shaft that penetrates the traction roller or the traction gear.

BACKGROUND OF THE INVENTION

PATENT LITERATURE 6 discloses a system in which a traction roller is inserted in a space between disks opposed to and arranged to rotate reversely to each other to form an infinitely variable speed converter. In this case, there is no description of a motor for driving the disks, which are arranged to rotate reversely to each other, and thus the relationship between the disk plates and the motor is not described clearly.

PATENT LITERATURE 2 discloses an infinitely variable speed converter having multiple thin dynamo/motors of large diameter joined via a central shaft and arranged to rotate reversely to each other for use as driving motors in an electric vehicle, in which a traction roller penetrated by a drive shaft is inserted in a space between a friction plate serving as a side plate of a rotor of an upper driving motor and a friction plate serving as a side plate of a rotor of a lower driving motor in such a manner as to come into contact with the upper and lower friction plates, whereby the traction roller is rotated and a torque is output to the drive shaft. In the literature, the friction plates that form the space in which the traction roller is inserted are described for the rotors of the respective upper and lower motors, indicating that the dynamo/motors are independent of and separated from each other. Accordingly, the infinitely variable speed converter is constituted, in the direction of the central shaft, by at least three structures of the at least two independent dynamo/motors and the variable transmission occupying the space between the dynamo/motors in the direction of the central shaft and, when installed, for example, under the floor of the cabin in a vehicle as a device for driving the vehicle, occupies a space of about 50 cm or more, imposing a limitation due to the thickness of the entire device in the direction of the central shaft of the dynamo/motors, such as that the height of the cabin floor in the vehicle has to be set to a significantly higher position compared to that of the driver's seat.

PATENT LITERATURE 4 discloses a dynamo/motor inside and/or around which traction gears are disposed to allow for speed conversion with a compact mechanism.

PATENT LITERATURE 5 discloses a drive system in which a group of traction gears around a dynamo/motor are switched effectively so that the entire drive system is compactified and settled with the dynamo/motor centered thereon.

PATENT LITERATURE 3 discloses a toroidal core motor system having a large diameter to be thinned easily in the direction of a central shaft. In the case of conventional ways for forming an armature by punching magnetic steel, since common magnetic steel sheets have a size of about 60 cm square, it is difficult to form a motor having a diameter greater than about 60 cm. Toroidal core motors, which can employ a wound core, can be fabricated easily to have a large diameter greater than about 60 cm. On the other hand, it is however difficult to mount a wound core used in such toroidal core motors to a shroud (including an exterior portion such as a housing or a case and an interior portion if the wound core is arranged to rotate), unlike the case of punching lamination for magnetic steel. In PATENT LITERATURE 3, amounting tool serving also as a magnetic pole portion is used to, for example, bore a mounting hole in the wound core, whereby the wound core can be mounted to the shroud with no property degradation. In particular, PATENT LITERATURE 3 provides an example for the mounting tool serving also as the magnetic pole portion that is clearly specified in Paragraph 0050 and FIG. 13, in which almost half of the mounting tool serving also as the magnetic pole portion is composed of non-magnetic material. This is of great help to the case where the distance between a toroidal core and a target to which the toroidal core is mounted is very large as in the present invention because magnetic material can be saved.

PATENT LITERATURE 1, which has not yet been published up to now, describes a dynamo/motor with built-in speed converter similar to one according to the present invention. In the present invention, three examples are added to PATENT LITERATURE 1.

CITATION LIST

Patent Literature

PATENT LITERATURE 1: JP5878662
PATENT LITERATURE 2: JP5432408
PATENT LITERATURE 3: JP5292656
PATENT LITERATURE 4: JP2010-263761
PATENT LITERATURE 5: JP2002-204504
PATENT LITERATURE 6: JPH05-263888

SUMMARY OF THE INVENTION

In the infinitely variable speed converter disclosed in PATENT LITERATURE 2 including the multiple dynamo/motors, which are arranged to rotate reversely to each other, and the traction roller inserted therebetween, a flywheel effect due to its large diameter makes rapid change in the revolving speed difficult, but quick speed conversion by the infinitely variable speed converter can solve the problem. Such a rapid change in the revolving speed of the dynamo/motor would also consume enormous current in a non-energy-saving manner, but the infinitely variable speed converter can rapidly change the revolving speed of the drive shaft with no change in the revolving speed of the dynamo/motor to practice energy conservation. However, since the arrangement requires at least two dynamo/motors and the infinitely variable speed converter composed of the traction roller is in a portion in contact with the exterior of the dynamo/motors, each occupying an independent space, it is difficult to thin and compactify the dynamo/motors in the direction of the central shaft. It is hence an object of the present invention to review such a conventional arrangement including at least two dynamo/motors and a speed converter and thereby to provide a new arrangement in which the entire dynamo/motor including a speed converter is thinned and compactified in the direction of the central shaft.

For a stator formed by annularly disposing permanent magnets or electromagnets, a space is provided in a portion surrounded by at least one rotor arranged to rotate clockwise with at least one of a drive disk and a drive gear, at least one rotor arranged to rotate counterclockwise with at least one of a drive disk and a drive gear, and a radial interior of the stator and, when at least one traction roller or traction gear penetrated by a drive shaft is inserted into the provided space to come into contact with the drive disks or the drive gears of the rotors, the traction roller or the traction gear is subject to a couple from the contacted drive disks or the drive gears of the rotors and thereby can output a torque to the drive shaft, whereby the entire structure including the speed converter can be compactified.

In the arrangement of the infinitely variable speed converter disclosed in PATENT LITERATURE 2, the thickness of the rotors in the direction of the central shaft cannot be reduced as well as there is a factor that requires increased maintenance such as fine adjustment when combining multiple dynamo/motors and the infinitely variable speed converter. However, in accordance with the present invention, rotors arranged to rotate reversely to each other are included and at least one of a traction roller and a traction gear for speed conversion is built in one dynamo/motor, whereby significant compactification can be achieved. In addition, the traction roller in contact with the drive disk or the traction gear in contact with the drive gear of the built-in rotors can, with its diameter, always keep proper the air gap between the field magnets disposed in the stator and the magnets in the rotors even when the dynamo/motor is subject to an external pressure, which exhibits an advantageous effect such as significant reduction in the number of parts that have to be adjusted during manufacture and/or maintenance.

BRIEF DESCRIPTION OF DRAWINGS

FIG. 1 shows a basic structure of a dynamo/motor with built-in speed converter according to the present invention. That is, a stator with field magnets disposed therein and rotors arranged to rotate, respectively, clockwise and counterclockwise with the stator provided therebetween form a space in which the opposed rotors are arranged to rotate reversely to each other. In the space in which at least two rotors arranged to rotate reversely to each other are opposed, there is at least one of a traction roller and a traction gear penetrated by a drive shaft, the peripheral portion of which is in contact with the rotor arranged to rotate clockwise and the rotor arranged to rotate counterclockwise and is arranged to be subject to a couple from the rotors and thereby to rotate to output a torque to the drive shaft. It is noted that in many of the drawings including FIG. 1, a drive disk with which the traction roller comes into contact, a drive gear with which the traction gear comes into contact, a housing and/or casing covering the entire dynamo/motor, a power supply, and/or electric wires may not be shown so that the major configuration cannot be obscured from view when shown clearly.

FIG. 2 shows a toroidal core with a wire wound around a wound core. The toroidal core is advantageous to manufacturing of an armature with a large diameter. The toroidal core coil is connected to the power supply for generating a rotating magnetic field via a commutator mechanism or a slip ring installed around the central shaft.

FIG. 3 (A) is a plan view for the case where the toroidal core arranged to rotate clockwise is held by the mounting tool serving also as the magnetic pole portion in PATENT LITERATURE 3 and mounted to the central shaft via a bearing. FIG. 3 (B) is a cross-sectional view of the toroidal core and the mounting tool.

FIG. 4 (A) is a plan view for the case where the toroidal core arranged to rotate counterclockwise is held by the mounting tool serving also as the magnetic pole portion in PATENT LITERATURE 3 and mounted to the central shaft via a bearing. It is noted that the drive disk is not included in FIG. 4 (A) because it would obscure the mounting tool from view. FIG. 4 (B) is a cross-sectional view of the toroidal core and the mounting tool.

FIG. 5 (A) is a plan view of the stator formed by disposing field magnets in an annular non-magnetic material. In a portion corresponding to the diameter of the stator, three traction rollers used for forward driving, one traction roller used for reverse driving, and one air-gap adjustment roller are arranged in a manner penetrated by the drive shaft. The traction rollers are in contact with the drive disk of the rotor. The air-gap adjustment roller rotates while in contact with the drive disk of the rotor to maintain the air gap between the magnets of the stator and the magnets of the rotors appropriately. The connection and disconnection between the multiple traction rollers in contact with the drive disk of the rotor and subject to a couple to rotate and the drive shaft is performed selectively by a power on-and-off device. FIG. 5 (B) shows a field magnet embedded in a portion of the stator corresponding to the line a-a'. FIG. 5 (C) shows a cross-section of the stator and the traction rollers penetrated by the drive shaft so that the connection and disconnection with the drive shaft can be performed selectively by the power on-and-off device.

FIG. 6 is a cross-sectional view of the dynamo/motor with built-in speed converter including three traction rollers penetrated by the drive shaft and arranged to be subject to a couple from the contacted drive disk of the rotor for forward driving, one traction roller for reverse driving, and one air-gap adjustment roller arranged to rotate while in contact with the drive disk to maintain the air gap between the magnets of the stator and the magnets of the rotors appropriately. This example shows an arrangement of the dynamo/motor with built-in speed converter of three-speed forward driving and one-speed reverse driving in which the connection and disconnection between the drive shaft and the traction rollers is performed selectively by the power on-and-off device.

FIG. 7 (A) is a plan view of the stator formed by disposing field magnets in an annular non-magnetic material. In a portion corresponding to the diameter of the plane formed by the stator, three traction gears used for forward driving, one traction gear used for reverse driving, and one air-gap adjustment gear are arranged in a manner penetrated by the drive shaft and arranged to be subject to a couple from the contacted drive gear of the rotor and thereby to rotate. The connection and disconnection between the drive shaft and the traction gears is performed selectively by the power on-and-off device. FIG. 7 (B) shows a field magnet embedded in a portion of the stator corresponding to the line a-a'. FIG. 7 (C) shows a cross-section of the stator and the traction gears penetrated by the drive shaft so that the connection and disconnection with the drive shaft can be performed selectively by the power on-and-off device.

FIG. 8 is a cross-sectional view of the dynamo/motor with built-in speed converter including three traction gears penetrated by the drive shaft and arranged to be subject to a couple from the contacted drive gear of the rotor for forward driving, one traction gear for reverse driving, and one air-gap adjustment gear. This example shows an arrangement of the dynamo/motor with built-in speed converter of three-speed forward driving and one-speed reverse driving in which the connection and disconnection between the drive shaft and the traction gears is performed selectively by the power on-and-off device.

FIG. 9 (A) shows one traction roller having a mechanism slidable arbitrarily on the penetrated drive shaft in the direction of the diameter of the stator and two air-gap adjustment rollers for maintaining the air gap between the magnets of the stator and the magnets of the rotors appropriately. FIG. 9 (B) shows a field magnet embedded in a portion of the stator corresponding to the line a-a'. FIG. 9 (C) shows a cross-section of the stator and the traction roller slidable on the drive shaft and the air-gap adjustment rollers for maintaining the air gap between the magnets of the rotor and the magnets of the stators appropriately.

FIG. 10 is a cross-sectional view of the dynamo/motor with built-in speed converter having a structure in which one traction roller penetrated by the drive shaft, slidable in the direction of the diameter of the stator, and forming the infinitely variable speed converter and one air-gap adjustment roller for maintaining the air gap between the magnets of the stator and the magnets of the rotors are arranged.

FIG. 11 (A) is a plan view of a portion of the toroidal core. FIG. 11 (B) shows that the polarity emerging on the magnetic pole portion of the toroidal core is the same in any direction, unlike common concentrated winding.

FIG. 12 shows an example dynamo/motor with built-in speed converter including multiple rotors arranged to rotate clockwise and multiple rotors arranged to rotate counterclockwise.

FIG. 13 (A) shows an example in which permanent magnets are disposed in each of the rotors arranged to rotate clockwise. FIG. 13 (B) shows an example in which concentrated winding electromagnets are disposed as field magnets in the stator. FIG. 13 (C) shows an example in which permanent magnets are disposed in each of the rotors arranged to rotate counterclockwise.

FIG. 14 (A) is a cross-sectional view around the drive shaft for the case where concentrated winding electromagnets are used as field magnets in the stator and permanent magnets are used in the rotors arranged to rotate reversely to each other. FIG. 14 (B) is a cross-sectional view for the case where concentrated winding electromagnets are used as field magnets in the stator and permanent magnets are used in the rotors arranged to rotate reversely to each other, at which the electromagnets can be shown.

FIG. 15 (A) shows an example in which permanent magnets are disposed in each of the rotors arranged to rotate clockwise. FIG. 15 (B) shows an example in which the concentrated winding field magnets in FIG. 13 are replaced with field magnets from two toroidal cores. FIG. 15 (C) shows an example in which permanent magnets are disposed in each of the rotors arranged to rotate counterclockwise.

FIG. 16 (A) is a cross-sectional view at a cross-section including the drive shaft according to the present invention for the case where field magnets from two toroidal cores are used in the stator and permanent magnets are used in the rotors. FIG. 16 (B) is a cross-sectional view at a cross-section including not the drive shaft but the mounting tool according to the present invention for the case where field magnets from two toroidal cores are used in the stator and permanent magnets are used in the rotors.

FIG. 17 shows an example in which a shaft is provided in the direction orthogonal to the drive shaft and an air-gap adjustment gear is provided additionally on the shaft. Such an additional provision can also be practiced in a combination of a traction roller and an air-gap adjustment roller.

FIG. 18 (A) is a plan view of a stator formed by disposing field magnets in an annular non-magnetic material. In a portion corresponding to the diameter of the plane formed by the stator, three traction gears used for front-wheel driving and three traction gears used for rear-wheel driving arranged in a manner penetrated by the drive shaft and arranged to be subject to a couple from the contacted drive gear of the rotor and thereby to rotate to achieve a four-wheel drive system. The connection and disconnection between the drive shaft and the traction gears is performed selectively by the power on-and-off device. FIG. 18 (B) shows a field magnet embedded in a portion of the stator corresponding to the line a-a'. FIG. 18 (C) shows a cross-section of the stator and the traction gears penetrated by the drive shaft so that the connection and disconnection with the drive shaft can be performed selectively by the power on-and-off device.

FIG. 19 shows an example in which a dynamo/motor with built-in speed converter according to the present invention having a speed converter of three-speed forward driving and one-speed reverse driving is installed under the floor of the cabin in a motor vehicle.

FIG. 20 shows an example in which a dynamo/motor with built-in speed converter according to the present invention having traction rollers that can change the revolving speed of four wheels independently for four-wheel steering (4WS) is installed under the floor of the cabin in a motor vehicle.

FIG. 21 shows an example helicopter in which a dynamo/motor with built-in speed converter according to the present invention that can output different revolving speeds to drive shafts in four directions is installed in a central portion and, on the outside thereof, rotary wings are disposed at four portions.

FIG. 22 (A) is a front elevational view of a sky carrier. FIG. 22 (B) is a plan view of the sky carrier that includes, in a central portion within the carrier, three dynamo/motors with built-in speed converter according to the present invention having drive shafts that can output different revolving speeds independently in four directions and disposed with 12 ducts passing through from the deck of the carrier body to the carrier bottom and having rotary wings therein. FIG. (C) is a side elevational view of the sky carrier.

DETAILED DESCRIPTION OF THE INVENTION

The present invention is achieved by an arrangement in which a set of rotors arranged to rotate reversely to each other with one of a drive disk and a drive gear among multiple rotors are opposed to each other and a space is formed in a portion with the radial interior of a stator, in which space a traction roller or a traction gear penetrated by a drive shaft is installed in such a manner that the peripheral portion thereof comes into contact with the drive disk or the drive gear of the rotors. Accordingly, the installed traction roller or traction gear is arranged to be subject to a couple from the drive disk or the drive gear of the rotors rotating reversely to each other and thereby to rotate, and can output a torque to the drive shaft. The present invention may therefore employ any type of dynamo/motor as long as two or more rotors are built in and the rotors can rotate reversely to each other. That is, the stator may selectively be a permanent magnet or an electromagnet and the winding of the armature may selectively be concentrated, distributed, toroidal, or other type. In addition, a radial-gap type configuration may be employed in which field magnets used in the stator have an approximately U shape, though axial-gap type is simpler.

There is thus only a few factor that imposes a limitation on the selection of a dynamo/motor for the arrangement of the present invention. However, the speed convertible range of the speed converter according to the present invention is limited by the diameter of the dynamo/motor, that is, the smaller the diameter, the narrower the selection in the speed conversion, while the larger the diameter, the wider the speed convertible range can be. Based on the characteristics in the speed convertible range of the present invention, examples of toroidal core motors with which large-diameter dynamo/motors can be fabricated easily and inexpensively will be provided, while other types of dynamo/motors will be presented only by their characteristic portions.

FIG. 1, which is also a typical drawing, is an example showing a basic structure of a dynamo/motor with built-in speed converter according to the present invention. In this example, permanent magnets (140) are used as field magnets in a stator (110), while toroidal cores (210) are used in rotors (121, 122), and a traction roller (310) is inserted between the rotor (121) arranged to rotate clockwise and the rotor (122) arranged to rotate counterclockwise. In FIG. 1, a drive disk (160) with which the traction roller (310) comes into contact, a housing and/or casing covering the entire dynamo/motor, a power supply, and/or electric wires are not shown so that the major configuration can be shown clearly without being obscured from view.

Each of the toroidal cores (210) forming the rotors (121, 122) shown in FIG. 1 is formed as toroidal core coil (212) around wound core (211), as shown in FIG. 2. Since the toroidal core (210) does not have a portion to be held when handled, a mounting tool (221) serving also as a magnetic pole portion is provided in a gap between any toroidal core coil (212) and adjacent toroidal core coil (212) and mounted rotatably to a central shaft (100), as shown in FIGS. 3 and 4.

The stator (110) shown in FIG. 5 is configured integrally with the drive shaft (150). That is, the drive shaft (150) runs on a path from a circumferential point of the stator (110) through the central shaft (100) to another point of the stator (110). Traction rollers (311) with built-in power on-and-off device are also arranged on the drive shaft (150), three for forward driving and one for reverse driving. One air-gap adjustment roller (312) is also arranged in a manner attached to the drive shaft (150), which is in an idle state without power connection even on the drive shaft (150). The power on-and-off device built in each traction roller (311) is fabricated with existing techniques including conventionally used clutch devices and lockable/unlockable ratchet mechanisms.

In FIG. 6, the three traction rollers (311) for forward driving, the one traction roller (311) for reverse driving, and the one air-gap adjustment roller (312) penetrated by the drive shaft (150) are installed in the space formed by the drive disk (160) of the rotor (121) arranged to rotate clockwise and the drive disk (160) of the rotor (122) arranged to rotate counterclockwise that are opposed to each other. The power on-and-off device that allows for arbitrary connection and disconnection with the drive shaft (150) is built in each traction roller (311). With the power on-and-off devices, one of the traction rollers (311) can be selected arbitrarily and connected to the drive shaft (150), that is, a dynamo/motor of three-speed forward driving and one-speed reverse driving is configured in FIG. 6.

In FIGS. 7 and 8, the traction rollers (311) in FIGS. 5 and 6 are replaced with traction gears (420). That is, three traction gears (421) for forward driving, one traction gear (421) for reverse driving, and one air-gap adjustment gear (422) that is in an idle state without power connection even on the drive shaft (150) are installed in a space formed by a drive gear (170) of the rotor (121) arranged to rotate clockwise and a drive gear (170) of the rotor (122) arranged to rotate counterclockwise that are opposed to each other, with one end of the periphery of each gear arranged to come into contact with the drive gear (170) of the rotor (121) arranged to rotate clockwise, while the other end of the periphery of each gear arranged to come into contact with the drive gear (170) of the rotor (122) arranged to rotate counterclockwise to provide a couple. In each of the traction gears (421) for forward driving and the traction gear (421) for reverse driving, a power on-and-off device is built that allows for arbitrary connection of any one of the traction gears (421) with the drive shaft (150). Accordingly, a dynamo/motor of three-speed forward driving and one-speed reverse driving is also configured in FIGS. 7 and 8.

In FIGS. 9 and 10, a tooth is formed in the longitudinal direction along the drive shaft (150) and a traction roller (313) is installed in a manner fitted and slid on the tooth via a sliding device. This allows the traction roller (313) to move to any position on the drive shaft (150) within the range of the drive disks (160) accompanying the rotors (120), whereby an infinitely variable speed converter can be configured. It is noted that since there is no traction roller for reverse driving mounted, the rotors (120) are commonly rotated for reverse driving reversely to the case for forward driving. It is also noted that if the central shaft (100) is removed for an arrangement of the present invention, the traction roller (313) is slidable on the diameter of the stator (110) to the opposite side, and thus the rotors (120) do not have to be rotated reversely.

FIG. 11 shows characteristics of magnetic poles generated by each of the toroidal cores (210) that are used in, for example, the typical drawing of the present invention. Magnetic pole portions (222) formed in the toroidal cores (210) are designated as, for example, north pole N collectively in any direction. This makes a contrast with the magnetic poles in the case of a concentrated winding armature (510) shown in FIG. 14.

FIG. 12 is an example dynamo/motor with built-in speed converter for achieving a larger torque in which multiple rotors (121, 122) are coupled and stacked with rotor couplers (123) therebetween. The number of stacks can be increased depending on the torque required.

FIG. 13 is a conceptual diagram for the case where armatures (electromagnets) (130) are used in the stator (110), while permanent magnets (140) are used in the rotors (121, 122), and the traction roller (310) is arranged between the rotor (121) and the rotor (122) opposed to and arranged to rotate reversely to each other.

As shown in FIG. 14 (B), a concentrated winding armature (510) is arranged in the stator (110). In the concentrated winding armature (510), once north pole N is generated at one end, the other end has different polarity, i.e. south pole S. This makes a contrast with the toroidal cores (210) shown in FIG. 11.

FIGS. 15 and 16 are an example in which each of the concentrated winding armatures (510) used in FIGS. 13 and 14 are replaced with two toroidal cores (210). Toroidal cores (210) may also be employed in the rotors (121, 122). The present invention can thus be achieved in any form as long as the drive disks (160) or the drive gears (170) of the rotors (121, 122) arranged to rotate reversely to each other are opposed to each other to form a space and, in this space, at least one of the traction roller (310) and the traction gear (421) penetrated by the drive shaft (150) can be arranged.

In FIGS. 5 to 14 and 16 showing embodiments of the present invention, the air-gap adjustment roller (312) or the air-gap adjustment gear (422) installed on the drive shaft (150) is provided. The air-gap adjustment roller (312) or the air-gap adjustment gear (422) is intended to maintain the gap between the magnetic poles against, for example, an external pressure applied to the rotors (120). However, in FIGS. 5 to 14 and 16, if an external pressure is applied from right above the traction roller (310), the traction gear (421), the air-gap adjustment roller (312), and/or the air-gap adjustment gear (422), an operating point occurs in a 90-degree delayed manner with respect to the point of application due to the characteristics of such a rotating body, so that there is nothing to prevent the gaps from changing at the location where the gaps may actually change. To address this, another air-gap adjustment gear (422) or air-gap adjustment roller (312) may be added as shown in the example of FIG. 17. If such a mechanism can be arranged in which the gaps between the magnetic poles of the stator and the rotors can be maintained at four points by the traction roller (310), the traction gear (421), the air-gap adjustment roller (312), and the air-gap adjustment gear (422), the gaps between the magnetic poles can be designed to be extremely small, which can contribute to an increase in the torque of the dynamo/motor.

While the dynamo/motor with built-in speed converter shown in FIGS. 5 to 16 of the present invention has only one drive shaft (150), multiple drive shafts (150) may be mounted with the central shaft (100) therebetween. In FIG. 18, a drive shaft (150) for front-wheel driving and a drive shaft (150) for rear-wheel driving are provided separately to achieve four-wheel driving.

FIG. 19 shows an example in which a dynamo/motor with built-in speed converter is installed under the floor of the cabin in a motor vehicle, the speed converter arranged such that at least one of a traction roller (310) and a traction gear (421) penetrated by a drive shaft (150) is inserted in a space formed by a drive disk (160) or a drive gear (170) of a rotor (121) arranged to rotate clockwise and a drive disk (160) or a drive gear (170) of a rotor (122) arranged to rotate counterclockwise that are opposed to each other. In this case, the traction gear (421) achieves a mechanism of three-speed forward driving and one-speed reverse driving.

If the dynamo/motor with built-in speed converter according to the present invention has a large diameter, multiple torques of independently different revolving speeds can be output simultaneously having both a large torque due to the large diameter and high revolution due to conversion in the speed converter with only one such dynamo/motor. In FIGS. 20 and 21, traction rollers (310) penetrated by drive shafts (150) that are installed in four directions are installed slidably in a space formed by a drive disk (160) of a rotor (121) arranged to rotate clockwise and a drive disk (160) of a rotor (122) arranged to rotate counterclockwise that are opposed to each other, so that independently different revolving speeds can be output to the respective drive shafts (150). Accordingly, a four-wheel steering (4WS) motor vehicle can be achieved easily in FIG. 20 with only one such dynamo/motor with built-in speed converter. A drone-type large helicopter can also be achieved in FIG. 21.

The dynamo/motor with built-in speed converter according to the present invention, which includes the air-gap adjustment roller or the air-gap adjustment gear, can maintain the gaps easily. This allows the effect of torque increase due to an increase in the diameter to be exhibited sufficiently. For example, a sky ferry or a sky carrier can be configured by combining some mechanisms for rotating four rotary wings with a diameter of about 30 m based on only one dynamo/motor with built-in speed converter with a diameter of 40 to 50 m. FIG. 22 shows an example sky carrier.

When the dynamo/motor with built-in speed converter according to the present invention is applied to an electric vehicle, the system in which the multiple traction rollers (310) or traction gears (421) included in the dynamo/motor with built-in speed converter are connected selectively by the power on-and-off devices to the drive shaft can provide effective driving modes for different purposes under programming control by a computer. For example, if an electromagnetic clutch is employed as the power on-and-off device incorporated in traction roller (310) or traction gear (421) for the first speed forward driving (Low) so that the electromagnetic force can be adjusted, half clutch can be achieved. Further, the optimum revolving speed of the dynamo/motor and one of the multiple traction rollers (310) or traction gears (421) to be connected to the drive shaft (150) can be selected from vehicle speed data under programming control by the computer. That is, it is relatively easy to select whichever one of hill start, sporty driving, or economic and gentle driving. Accordingly, the easiness of programming control by the computer as the characteristics of the dynamo/motor with built-in speed converter allows to provide a driving motor most suitable for anticipated automatic control and/or automatic operation of electric vehicles.

Example 1

FIGS. 6, 8, 10, 12, 14, and 16 show examples of dynamo/motors with built-in speed converter characterized by having, for a stator formed by annularly disposing permanent magnets or electromagnets as field magnets, at least one rotor mounted rotatably to a central shaft to rotate clockwise with at least one of a drive disk and a drive gear on one axial side at the center of the annular stator and at least one rotor mounted rotatably to the central shaft to rotate counterclockwise with at least one of a drive disk and a drive gear on the other axial side at the center of the annular stator, the dynamo/motor with built-in speed converter having a structure in which a space is provided in a portion surrounded by the drive disk or the drive gear of the rotor arranged to rotate clockwise, the drive disk or the drive gear of the rotor arranged to rotate counterclockwise, and the radial interior of the stator and, when a traction roller or a traction gear penetrated by a drive shaft is inserted into the provided space, the traction roller comes into contact with the drive disk to be subject to a couple and thereby to rotate, while the traction gear comes into contact with the drive gear to be subject to a couple and thereby to rotate, whereby an output can be provided to the drive shaft that penetrates the traction roller or the traction gear.

Example 2

FIGS. 6, 8, 12, 14, 16, and 19 show examples of the dynamo/motors with built-in speed converter described in Example 1, in which the connection and disconnection between the traction rollers or traction gears and the drive shaft can be selected arbitrarily by the power on-and-off devices.

Example 3

FIGS. 10, 20, 21, and 22 show examples of the dynamo/motors with built-in speed converter described in Example 1, in which the traction rollers are made slidable on the drive shaft.

INDUSTRIAL APPLICABILITY

Dynamo/motors have two conflicting requirements: increased torque for driving heavy vehicles such as large-sized vehicles and tanks and reduced weight for mounting on aircrafts such as helicopters and drones. In order to meet these two requirements simultaneously, it is necessary to increase the diameter and therefore the torque of such a dynamo/motor as well as maintain the gaps between the magnets in the peripheral portion appropriately even with such an increased diameter, and further to concentrate the mechanisms for rotation in the peripheral portion of the dynamo/motor for hollowing of the central portion and therefore weight reduction. In the mechanism according to the present invention in which a torque is extracted by inserting the traction roller or the traction gear penetrated by the drive shaft into the space in which the drive disk or the drive gear of the rotor arranged to rotate clockwise and the drive disk or the drive gear of the rotor arranged to rotate counterclockwise are opposed to each other, the air-gap adjustment roller or the air-gap adjustment gear penetrated by the drive shaft or the traction roller or the traction gear itself penetrated by the drive shaft makes it easy to maintain, with its diameter, the gaps between the magnets installed in the peripheral portion of the dynamo/motor in an extremely narrow state of about 0.5 mm regardless of the diameter of the dynamo/motor. This allows the two requirements of torque increase and weight reduction to be met simultaneously for utilization as a power source for both tanks and helicopters. In addition, since the dynamo/motor with built-in speed converter according to the present invention has a simple structure, a small number of parts, and a mechanism with which the gaps can be maintained appropriately even under an external pressure, the number of sites to be adjusted upon installation can be reduced, which also exhibits an effect of reduction in the manufacturing cost and/or the running cost when used as a driving motor of an electric vehicle.

REFERENCE SIGNS LIST

100: Central shaft
110: Stator
120: Rotor
121: Rotor (arranged to rotate clockwise)
122: Rotor (arranged to rotate counterclockwise)
123: Rotor coupler
130: Armature (electromagnet)
140: Permanent magnet
150: Drive shaft
160: Drive disk
170: Drive gear
210: Toroidal core
211: Wound core
212: Toroidal core coil
221: Mounting tool
222: Magnetic pole portion of the mounting tool
310: Traction roller
311: Traction roller (with power on-and-off device)
312: Air-gap adjustment roller
313: Traction roller (with sliding device)
420: Traction gear
421: Traction gear (with power on-and-off device)
422: Air-gap adjustment gear
510: Concentrated winding armature
511: Laminated magnetic steel sheet
512: Concentrated winding
513: Concentrated winding armature holder
611: aircraft
612: Deck operation monitoring pole
613: Propulsive direction controlling rotor
614: Warning and surveillance radar

The invention claimed is:

1. A dynamo/motor with built-in speed converter comprising:
   a stator formed by annularly disposing permanent magnets or electromagnets as field magnets,
   at least one rotor mounted rotatably to a central shaft to rotate clockwise with at least one of a drive disk and a drive gear on one axial side at the center of the annular stator, and
   at least one rotor mounted rotatably to the central shaft to rotate counterclockwise with at least one of a drive disk and a drive gear on the other axial side at the center of the annular stator,
   wherein a space is provided in a portion surrounded by the drive disk or the drive gear of the rotor arranged to rotate clockwise, the drive disk or the drive gear of the rotor arranged to rotate counterclockwise, and the radial interior of the stator and, when a traction roller or a traction gear penetrated by a drive shaft is inserted into the provided space, the traction roller comes into contact with the drive disk to be subject to a coupling and thereby to rotate, while the traction gear comes into contact with the drive gear to be subject to a coupling and thereby to rotate, whereby an output can be provided to the drive shaft that penetrates the traction roller or the traction gear, and
   wherein the dynamo/motor includes at least one of an air-gap adjustment roller and an air-gap adjustment gear disposed in the space and installed on the drive shaft, wherein the air-gap adjustment roller or the air-gap adjustment gear is configured to maintain the air gap between the magnets of the stator and the magnets of each rotor.

2. The dynamo/motor with built-in speed converter according to claim 1, wherein the connection between the traction roller or the traction gear and the drive shaft is made optionally selectable by a power on-and-off device between connection and disconnection.

3. The dynamo/motor with built-in speed converter according to claim 1, wherein the traction roller is made slidable on the drive shaft.

4. The dynamo/motor with built-in speed converter according to claim 1, further comprising a second traction roller, a third traction roller, and a fourth traction roller, wherein said fourth traction rotor is for reverse driving.

* * * * *